United States Patent
Oishi et al.

(10) Patent No.: US 11,240,069 B2
(45) Date of Patent: Feb. 1, 2022

(54) COMMUNICATION DEVICE, INFORMATION PROCESSING METHOD, AND STORAGE MEDIUM

(71) Applicants: KABUSHIKI KAISHA TOKAI RIKA DENKI SEISAKUSHO, Aichi (JP); NAGOYA INSTITUTE OF TECHNOLOGY, Aichi (JP)

(72) Inventors: Yoshiki Oishi, Aichi (JP); Kenichi Koga, Aichi (JP); Tatsuya Koike, Aichi (JP); Nobuyoshi Kikuma, Aichi (JP)

(73) Assignees: KABUSHIKI KAISHA TOKAI RIKA DENKI SEISAKUSHO, Aichi (JP); NAGOYA INSTITUTE OF TECHNOLOGY, Aichi (JP)

( * ) Notice: Subject to any disclaimer, the term of this patent is extended or adjusted under 35 U.S.C. 154(b) by 0 days.

(21) Appl. No.: 17/155,746

(22) Filed: Jan. 22, 2021

(65) Prior Publication Data
US 2021/0243054 A1   Aug. 5, 2021

(30) Foreign Application Priority Data

Jan. 31, 2020 (JP) .............................. JP2020-015207
Aug. 21, 2020 (JP) .............................. JP2020-139855
Dec. 8, 2020 (JP) .............................. JP2020-203666

(51) Int. Cl.
*H04L 25/02* (2006.01)
*H04B 1/7105* (2011.01)
*H04L 27/26* (2006.01)

(52) U.S. Cl.
CPC ..... *H04L 25/0204* (2013.01); *H04B 1/71052* (2013.01); *H04L 25/0242* (2013.01); *H04L 27/2647* (2013.01)

(58) Field of Classification Search
CPC ...... H04B 1/709; H04B 1/71052; H04B 7/24; H04B 7/2612; H04B 7/264; H04B 7/2643; H04B 7/2659
(Continued)

(56) References Cited

U.S. PATENT DOCUMENTS

2006/0149540 A1* 7/2006 Singh .................... G10L 19/107
                                                                704/223
2009/0323777 A1* 12/2009 Wang ................. H04B 1/71072
                                                                375/148

(Continued)

FOREIGN PATENT DOCUMENTS

WO    2015/176776    11/2015

*Primary Examiner* — Young T. Tse
(74) *Attorney, Agent, or Firm* — Greenblum & Bernstein, P.L.C.

(57) ABSTRACT

A communication device is configured to correlate a first signal with a second signal at a designated interval, the second signal corresponding to the first signal and being received by the communication device where the other communication device transmits a signal including a pulse as the first signal, convert a correlation computation result that is a result of correlating the first signal with the second signal at the designated interval into a format including a matrix product of an expanded modal matrix and an expanded signal vector, the expanded modal matrix including a plurality of elements indicating the correlation computation result obtained when assuming that the signals are received at respective set times, the expanded signal vector being a vector including a plurality of elements, each of which indicates whether or not there is a signal received at each of the set times and amplitude and phase of the signal.

18 Claims, 15 Drawing Sheets

(58) Field of Classification Search
USPC ....... 375/142, 150, 259, 260, 262, 265, 267,
375/343; 370/328, 345; 455/500, 517
See application file for complete search history.

(56) References Cited

U.S. PATENT DOCUMENTS

2013/0082867 A1* 4/2013 Malaga .................. H04B 7/086
342/40
2013/0300609 A1* 11/2013 Watanabe ............. G01S 5/0273
342/453

* cited by examiner

COMMUNICATION DEVICE, INFORMATION PROCESSING METHOD, AND STORAGE MEDIUM

CROSS REFERENCE TO RELATED APPLICATION(S)

This application is based upon and claims benefit of priority from Japanese Patent Application No. 2020-015207, filed on Jan. 31, 2020, Japanese Patent Application No. 2020-139855, filed on Aug. 21, 2020, and Japanese Patent Application No. 2020-203666, filed on Dec. 8, 2020, the entire contents of which are incorporated herein by reference.

BACKGROUND

The present invention relates to a communication device, an information processing method, and a storage medium.

In recent years, technologies that allow one device to determine a position of another device in accordance with a result of transmitting/receiving a signal between the devices have been developed. As an example of the technologies of determining a position, WO 2015/176776 A1 discloses a technology that allows an UWB (ultra-wideband) receiver to determine an angle of incidence of a wireless signal from an UWB transmitter by performing wireless communication section using UWB.

However, although the technology disclosed in WO 2015/176776 A1 determines the angle of incidence of the wireless signal, there is a room for improvement in accuracy of measuring a distance between the UWB receiver and the UWB transmitter.

In other words, it has been desired to further improve the accuracy of measuring a distance between devices with regard to the technologies of measuring a distance between one device and another device.

Accordingly, the present invention is made in view of the aforementioned issues, and an object of the present invention is to provide a mechanism that makes it possible to improve accuracy of measuring a distance between a plurality of devices.

SUMMARY

To solve the above described problem, according to an aspect of the present invention, there is provided a communication device comprising: a wireless communication section configured to wirelessly receive a signal from another communication device; and a control section configured to correlate a first signal with a second signal at a designated interval, the second signal corresponding to the first signal and being received by the wireless communication section in a case where the other communication device transmits a signal including a pulse as the first signal, convert a correlation computation result that is a result of correlating the first signal with the second signal at the designated interval into a format including a matrix product of an expanded modal matrix and an expanded signal vector, the expanded modal matrix being a matrix including a plurality of elements indicating the correlation computation result obtained when assuming that the signals are received at respective set times, the expanded signal vector being a vector including a plurality of elements, each of which indicates whether or not there is a signal received at each of the set times and amplitude and a phase of the signal, and estimate reception time of the second signal on a basis of the set times corresponding to the plurality of elements of the expanded signal vector, wherein an interval between the set times is shorter than the designated interval.

To solve the above described problem, according to another aspect of the present invention, there is provided an information processing method comprising: wirelessly receiving a signal from another communication device; correlating a first signal with a second signal at a designated interval, the second signal corresponding to the first signal and being received in a case where the other communication device transmits a signal including a pulse as the first signal; converting a correlation computation result that is a result of correlating the first signal with the second signal at the designated interval into a format including a matrix product of an expanded modal matrix and an expanded signal vector, the expanded modal matrix being a matrix including a plurality of elements indicating the correlation computation result obtained when assuming that the signals are received at respective set times, the expanded signal vector being a vector including a plurality of elements, each of which indicates whether or not there is a signal received at each of the set times and amplitude and a phase of the signal; and estimating reception time of the second signal on a basis of the set times corresponding to the plurality of elements of the expanded signal vector, wherein an interval between the set times is shorter than the designated interval.

To solve the above described problem, according to another aspect of the present invention, there is provided a storage medium having a program stored therein, the program causing a computer to function as a control section configured to correlate a first signal with a second signal at a designated interval, the second signal corresponding to the first signal and being received by a wireless communication section that wirelessly receives a signal from another communication device in a case where the other communication device transmits a signal including a pulse as the first signal, convert a correlation computation result that is a result of correlating the first signal with the second signal at the designated interval into a format including a matrix product of an expanded modal matrix and an expanded signal vector, the expanded modal matrix being a matrix including a plurality of elements indicating the correlation computation result obtained when assuming that the signals are received at respective set times, the expanded signal vector is a vector including a plurality of elements, each of which indicates whether or not there is a signal received at each of the set times and amplitude and a phase of the signal, and estimate reception time of the second signal on a basis of the set times corresponding to the plurality of elements of the expanded signal vector, wherein an interval between the set times is shorter than the designated interval.

As described above, according to the present invention, it is possible to provide the mechanism that makes it possible to improve accuracy of estimating a distance between a plurality of devices.

DETAILED DESCRIPTION OF THE EMBODIMENT(S)

Figure 1:
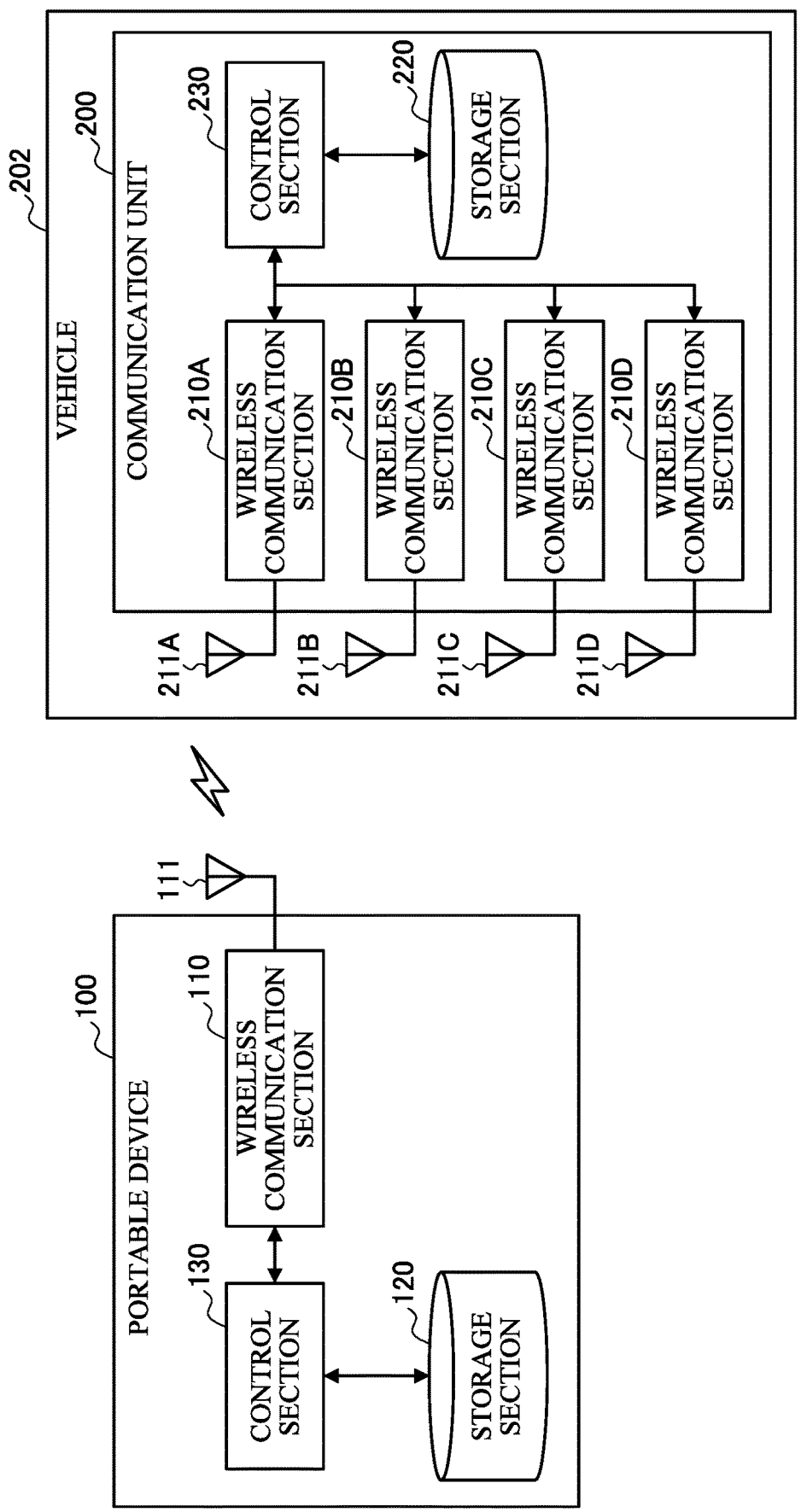
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in the present specification and the drawings, different alphabets are suffixed to a same reference numeral to distinguish elements which have substantially the same functional configuration. For example, a plurality of elements which have substantially the same functional configuration are distinguished such as wireless communication sections 210A, 210B, and 210C, as necessary. However, when there is no need in particular to distinguish structural elements that have substantially the same functional configuration, the same reference numeral alone is attached. For example, in a case in which it is not necessary to particularly distinguish the wireless communication sections 210A, 210B, and 210C, the wireless communication sections 210A, 210B, and 210C are simply referred to as the wireless communication sections 210.

1. Configuration Example

FIG. 1 is a diagram illustrating an example of a configuration of a system 1 according to an embodiment of the present invention. As illustrated in FIG. 1, the system 1 according to the present embodiment includes a portable device 100 and a communication unit 200. The communication unit 200 according to the present embodiment is installed in a vehicle 202. The vehicle 202 is an example of a usage target of the user.

A communication device of an authenticatee and a communication device of an authenticator are involved in the present embodiment. In the example illustrated in FIG. 1, the portable device 100 is an example of the communication device of the authenticatee, and the communication unit 200 is an example of the communication device of the authenticator.

When a user (for example, a driver of the vehicle 202) carrying the portable device 100 approaches the vehicle 202, the system 1 performs wireless communication for authentication between the portable device 100 and the communication unit 200 installed in the vehicle 202. Next, when the authentication succeeds, the vehicle 202 becomes available for the user by unlocking a door lock of the vehicle 202 or starting an engine of the vehicle 202. The system 1 is also referred to as a smart entry system. Next, respective structural elements will be described sequentially.

(1) Portable Device 100

The portable device 100 is configured as any device to be carried by the user. Examples of the any device include an electronic key, a smartphone, a wearable terminal, and the like. As illustrated in FIG. 1, the portable device 100 includes a wireless communication section 110, a storage section 120, and a control section 130.

The wireless communication section 110 has a function of performing wireless communication with the communication unit 200 installed in the vehicle 202. The wireless communication section 110 receives a wireless signal from the communication unit 200 installed in the vehicle 202 and transmits the wireless signal.

For example, wireless communication is performed between the wireless communication section 110 and the communication unit 200 by using an ultra-wideband (UWB) signal, for example. In the wireless communication of the UWB signal, it is possible for impulse UWB to measure propagation delay time of a radio wave with high accuracy by using the radio wave of ultra-short pulse width of a nanosecond or less, and it is possible to perform ranging with high accuracy on the basis of the propagation delay time. Note that, the propagation delay time is time from transmission to reception of the radio wave. The wireless communication section 110 is configured as a communication interface that makes it possible to perform communication by using the UWB signals, for example.

Note that, the UWB signal may be transmitted/received as a ranging signal, an angle estimation signal, and a data signal, for example. The ranging signal is a signal transmitted and received in the ranging process (to be described later). The ranging signal may be configured in a frame format that does not include a payload part for storing data or in a frame format that includes the payload part. The angle estimation signal is a signal transmitted and received in an angle estimation process (to be described later). The angle estimation signal may be configured in a way similar to the ranging signal. The data signal is preferably configured in the frame format that includes the payload part for storing the data.

Here, the wireless communication section 110 includes at least one antenna 111. In addition, the wireless communication section 110 transmits/receives a wireless signal via the at least one antenna 111.

The storage section 120 has a function of storing various kinds of information for operating the portable device 100. For example, the storage section 120 stores a program for operating the portable device 100, and an identifier (ID), password, and authentication algorithm for authentication, or the like. For example, the storage section 120 includes a storage medium such as flash memory and a processing device that performs recording/playback on/of the storage medium.

The control section 130 has a function of executing processes in the portable device 100. For example, the control section 130 controls the wireless communication section 110 to perform communication with the communication unit 200 of the vehicle 202. The control section 130 reads information from the storage section 120 and writes information into the storage section 120. The control section 130 also functions as an authentication control section that controls an authentication process between the portable device 100 and the communication unit 200 of the vehicle 202. For example, the control section 130 may include a central processing unit (CPU) and an electronic circuit such as a microprocessor.

(2) Communication Unit 200

The communication unit 200 is prepared in association with the vehicle 202. Here, it is assumed that the communication unit 200 is installed in the vehicle 202 in such a manner that communication section 200 is installed in a vehicle interior of the vehicle 202, the communication section 200 is built in the vehicle 202 as a communication module, or in other manners. Alternatively, the communication unit 200 may be prepared as a separate object from the vehicle 202 in such a manner that the communication unit 200 is installed in a parking space for the vehicle 202 or in other manners. In this case, the communication unit 200 may wirelessly transmit a control signal to the vehicle 202 on the basis of a result of communication with the portable device 100 and may remotely control the vehicle 202. As illustrated in FIG. 1, the communication unit 200 includes a plurality of wireless communication sections 210 (210A to 210D), a storage section 220, and a control section 230.

The wireless communication section 210 has a function of performing wireless communication with the wireless communication section 110 of the portable device 100. The wireless communication section 210 receives a wireless signal from the portable device 100 and transmits a wireless signal to the portable device 100. The wireless communication section 210 is configured as a communication interface that makes it possible to perform communication by using the UWB signals, for example.

Here, each of the wireless communication sections 210 includes an antenna 211. In addition, each of the wireless communication sections 210 transmits/receives a wireless signal via the antenna 211.

The storage section 220 has a function of storing various kinds of information for operating the communication unit 200. For example, the storage section 220 stores a program for operating the communication unit 200, an authentication algorithm, and the like. For example, the storage section 220 includes a storage medium such as flash memory and a processing device that performs recording/playback on/of the storage medium.

The control section 230 has a function of controlling overall operation performed by the communication unit 200 and in-vehicle equipment installed in the vehicle 202. For example, the control section 230 controls the wireless communication sections 210 to perform communication with the portable device 100. The control section 230 reads information from the storage section 220 and writes information into the storage section 220. The control section 230 also functions as an authentication control section that controls the authentication process between the mobile device 100 and the control system 100 of the vehicle 200. In addition, the control section 230 also functions as a door lock control section that controls the door key of the vehicle 202, and locks and unlocks doors with the door key. The control section 230 also functions as an engine control section that controls the engine of the vehicle 202, and starts/stops the engine. Note that, a motor or the like may be installed as a power source in the vehicle 202 in addition to the engine. For example, the control section 230 is configured as an electronic circuit such as an electronic control unit (ECU).

2. Technical Features

<2.1. Positional Parameter>

The communication unit 200 (specifically, control section 230) according to the present embodiment performs a positional parameter estimation process of estimating a positional parameter that represents a position of the portable device 100. Hereinafter, with reference to FIG. 2 to FIG. 4, various definitions related to the positional parameter will be described.

Figure 2:
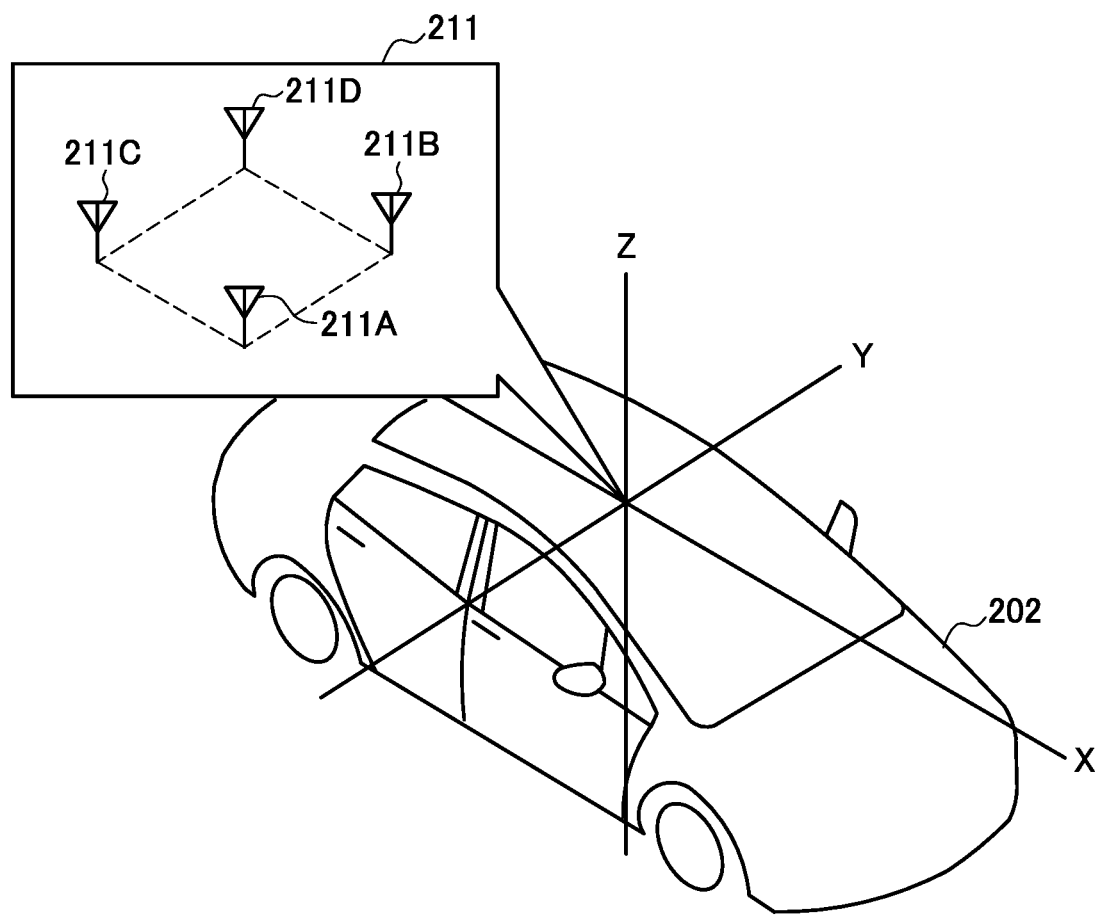
FIG. 2 is a diagram illustrating an example of arrangement of a plurality of antennas installed in a vehicle according to the embodiment.

FIG. 2 is a diagram illustrating an example of arrangement of the plurality of antennas 211 (wireless communication sections 210) installed in the vehicle 202 according to the present embodiment. As illustrated in FIG. 2, the four antennas 211 (211A to 211D) are installed on a ceiling of the vehicle 202. The antenna 211A is installed on a front right side of the vehicle 202. The antenna 211B is installed on a front left side of the vehicle 202. The antenna 211C is installed on a rear right side of the vehicle 202. The antenna 211D is installed on a rear left side of the vehicle 202. Note that, a distance between adjacent antennas 211 are set to half or less of wavelength λ of an angle estimation signal (to be described later). A local coordinate system of the communication unit 200 is set as a coordinate system based on the communication unit 200. An example of the local coordinate system of the communication unit 200 has its origin at the center of the four antennas 211. This local coordinate system has its X axis along a front-rear direction of the vehicle 202, its Y axis along a left-right direction of the vehicle 202, and its Z axis along an up-down direction of the vehicle 202. Note that, the X axis is parallel to a line connecting a pair of the antennas in the front-rear direction (such as a pair of the antenna 211A and the antenna 211C, and a pair of the antenna 211B and the antenna 211D). In addition, the Y axis is parallel to a line connecting a pair of the antennas in the left-right direction (such as a pair of the antenna 211A and the antenna 211B, and a pair of the antenna 211C and the antenna 211D).

Note that, the arrangement of the four antennas is not limited to the square shape. The arrangement of the four antennas may be a parallelogram shape, a trapezoid shape, a rectangular shape, or any other shapes. Of course, the number of antennas 211 is not limited to four.

Figure 3:
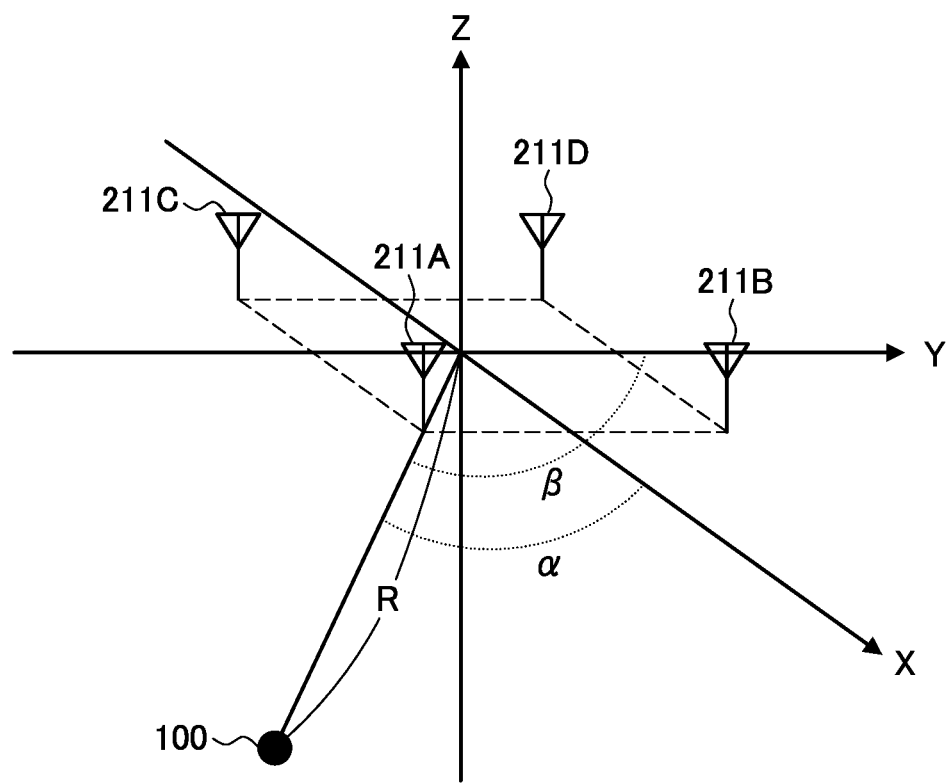
FIG. 3 is a diagram illustrating an example of a positional parameter of a portable device according to the embodiment.

FIG. 3 is a diagram illustrating an example of positional parameters of the portable device 100 according to the present embodiment. The positional parameters may include a distance R between the portable device 100 and the communication unit 200. The distance R illustrated in FIG. 3 is a distance from the origin of the local coordinate system of the communication unit 200 to the portable device 100. The distance R is estimated on the basis of a result of transmission/reception of a ranging signal (to be described later) between the portable device 100 and one of the plurality of wireless communication sections 210. The distance R may be a distance between the portable device 100 and the single wireless communication section 210 that transmits/receives the ranging signal (to be described later).

In addition, as illustrated in FIG. 3, the positional parameters may include an angle of the portable device 100 based on the communication unit 200, the angle including an angle α between the X axis and the portable device 100 and an angle β between the Y axis and the portable device 100. The angles α and β are angles between the coordinate axes and a straight line connecting the portable device 100 with the origin on a first predetermined coordinate system. For example, the first predetermined coordinate system is the local coordinate system of the communication unit 200. The angle α is an angle between the X axis and the straight line connecting the portable device 100 with the origin. The angle β is an angle between the Y axis and the straight line connecting the portable device 100 with the origin.

Figure 4:
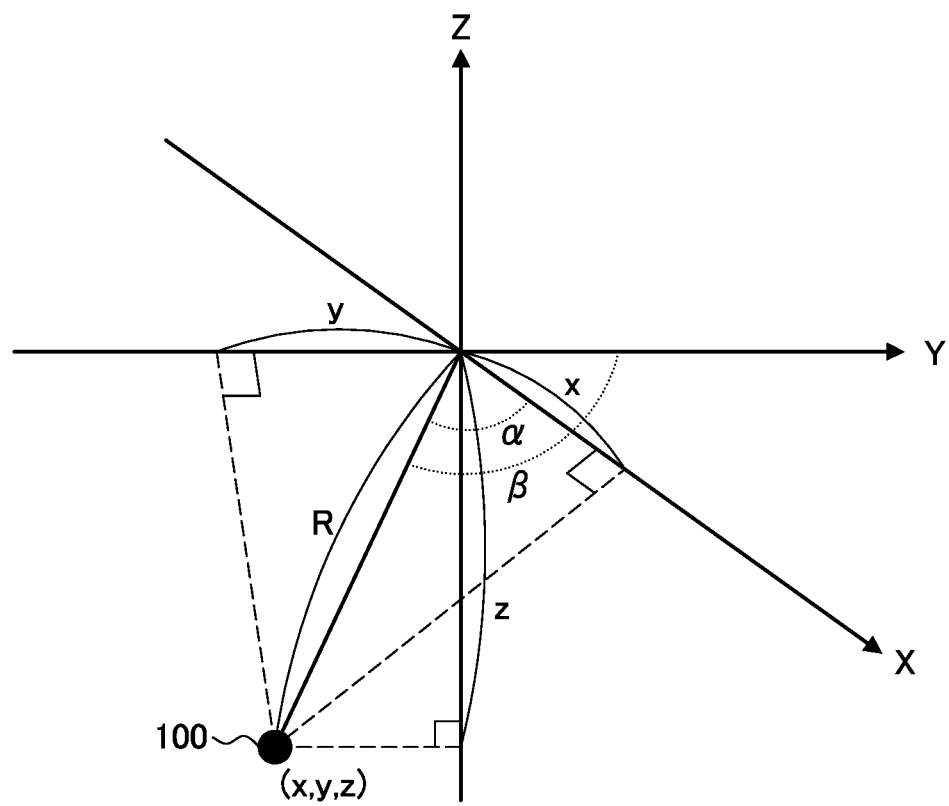
FIG. 4 is a diagram illustrating an example of a positional parameter of the portable device according to the embodiment.

FIG. 4 is a diagram illustrating an example of positional parameters of the portable device 100 according to the present embodiment. The positional parameters may include coordinates of the portable device 100 in a second predetermined coordinate system. In FIG. 4, a coordinate x on the X axis, a coordinate y on the Y axis, and a coordinate z on the Z axis of the portable device 100 are an example of such coordinates. In other words, the second predetermined coordinate system may be the local coordinate system of the communication unit 200. Alternatively, the second predetermined coordinate system may be a global coordinate system.

<2.2. CIR>

(1) CIR Calculation Process

In the positional parameter estimation process, the portable device 100 and the communication unit 200 communicate with each other to estimate the positional parameters. At this time, the portable device 100 and the communication unit 200 calculates channel impulse responses (CIRs).

The CIR is a response obtained when an impulse is input to the system. In the case where a wireless communication section of one of the portable device 100 and the communication unit 200 (hereinafter, also referred to as a transmitter) transmits a signal including a pulse as a first signal, the CIR according to the present embodiment is calculated on the basis of a second signal that corresponds to the first signal and that is received by a wireless communication section of the other (hereinafter, also referred to as a receiver). It can be said that the CIR indicates characteristics of a wireless communication path between the portable device 100 and the communication unit 200. Hereinafter, the first signal is also referred to as a transmission signal, and the second signal is also referred to as a reception signal.

For example, the CIR may be a correlation computation result that is a result obtained by correlating the transmission signal with the reception signal at each designated interval. Here, the correlation may be sliding correlation that is a process of correlating the transmission signal with the reception signal by shifting relative positions of the signals in time directions. The CIR includes a correlation value indicating a degree of the correlation between the transmission signal and the reception signal as an element obtained at each designated interval. The designated interval is an interval between timings at which the receiver samples the reception signal. Therefore, an element included in the CIR is also referred to as a sampling point. The correlation value may be a complex number including the IQ components. In addition, the correlation value may be a phase or amplitude of a complex number. In addition, the correlation value may be electric power that is a sum of squares of an I component and a Q component of the complex number (or square of amplitude).

The CIR is also considered as a set of elements that are values obtained at respective times (hereinafter, also referred to as CIR values). In this case, the CIR is chronological variation in the CIR value. In the case where the CIR is the correlation computation result, the CIR value is the correlation value.

For another example, the CIR may be the reception signal obtained at each designated interval (complex number including IQ components). Alternatively, the CIR may be a phase or amplitude of the reception signal obtained at each designated interval. Alternatively, the CIR may be an electric power value that is a sum of squares of an I component and a Q component of the reception signal obtained at each designated interval.

Note that, the portable device 100 and the communication unit 200 acquire time by using a time counter. The time counter is a counter that counts (typically, increments) a value (hereinafter, also referred to as count value) indicating elapsed time obtained at a predetermined time interval (hereinafter, also referred to as count cycle). A current time is calculated by the count value counted by the time counter, the count cycle, and a count start time. If different devices have a same count cycle and a same count start time, this means that these devices are in synchronization with each other. On the other hand, if at least any of the count cycle and the count start time is different between the different devices, this means that these devices are not in synchronization with each other or are asynchronous with each other. The portable device 100 and the communication unit 200 may be in synchronization with each other or asynchronous with each other. In addition, the plurality of wireless communication sections 210 may be in synchronization with each other or asynchronous with each other. The designated interval used when calculating the CIR may be an integer multiple of the count cycle of the time counter. Hereinafter, description will be given on an assumption that the portable device 100 and the plurality of wireless communication sections 210 are in synchronization with each other unless otherwise noted.

Hereinafter, with reference to FIG. 5 to FIG. 6, a CIR calculation process performed in the case where the portable device 100 serves as the transmitter and the communication unit 200 serves as the receiver will be described in detail.

Figure 5:
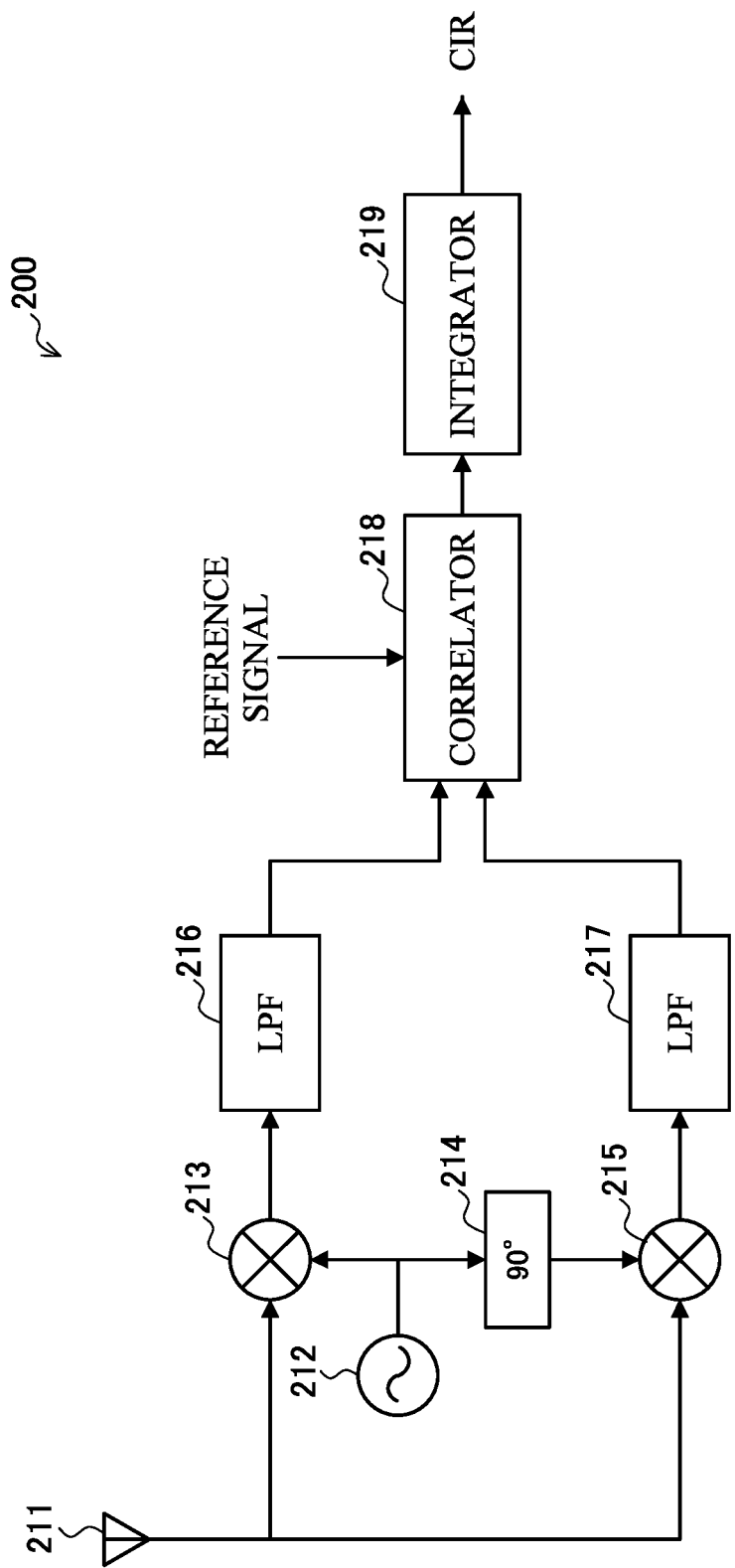
FIG. 5 is a diagram illustrating an example of processing blocks for signal processing in a communication unit according to the embodiment.

FIG. 5 is a diagram illustrating an example of processing blocks for signal processing in the communication unit 200 according to the present embodiment. As illustrated in FIG. 5, the communication unit 200 includes an oscillator 212, a multiplier 213, a 90-degree phase shifter 214, a multiplier 215, a low pass filter (LPF) 216, a LPF 217, a correlator 218, and an integrator 219.

The oscillator 212 generates a signal of same frequency as frequency of a carrier wave that carries a transmission signal, and outputs the generated signal to the multiplier 213 and the 90-degree phase shifter 214.

The multiplier 213 multiplies a reception signal received by the antenna 211 and the signal output from the oscillator 212, and outputs a result of the multiplication to the LPF 216. Among input signals, the LPF 216 outputs a signal of lower frequency than the frequency of the carrier wave that carries the transmission signal, to the correlator 218. The signal input to the correlator 218 is an I component (that is, a real part) among components corresponding to an envelope of the reception signal.

The 90-degree phase shifter 214 delays the phase of the input signal by 90 degrees, and outputs the delated signal to the multiplier 215. The multiplier 215 multiplies the reception signal received by the antenna 211 and the signal output from the 90-degree phase shifter 214, and outputs a result of the multiplication to the LPF 217. Among input signals, the LPF 217 outputs a signal of lower frequency than the frequency of the carrier wave that carries the transmission signal, to the correlator 218. The signal input to the correlator 218 is a Q component (that is, an imaginary part) among the components corresponding to the envelope of the reception signal.

The correlator 218 calculates the CIR by correlating a reference signal with the reception signals including the I component and the Q component output from the LPF 216 and the LPF 217 through the sliding correlation. Note that, the reference signal described herein is the same signal as the transmission signal before multiplying the carrier wave.

The integrator 219 integrates the CIRs output from the correlator 218, and outputs the integrated CIRs.

Here, the transmitter may transmit a signal including a preamble as the transmission signal. The preamble includes a plurality of preamble symbols. The preamble is a sequence known to the transmitter and the receiver. Typically, the preamble is arranged at a head of the transmission signal. The preamble symbol is a pulse sequence including one or more pulses. The pulse sequence is a set of the plurality of pulses that are separate from each other in the time direction. The preamble symbol is a target of integration performed by the integrator 219. Therefore, the correlator 218 calculates the CIR for each of the preamble symbols by correlating the preamble symbol included in the transmission signal (that is, reference signal) with respective portion corresponding to the plurality of preamble symbols included in the reception signal through the sliding correlation. Next, the integrator 219 outputs integrated CIRs by integrating the CIRs of the respective preamble symbols with regard to the one or more preamble symbols included in the preamble.

(2) Example of CIR

Figure 6:
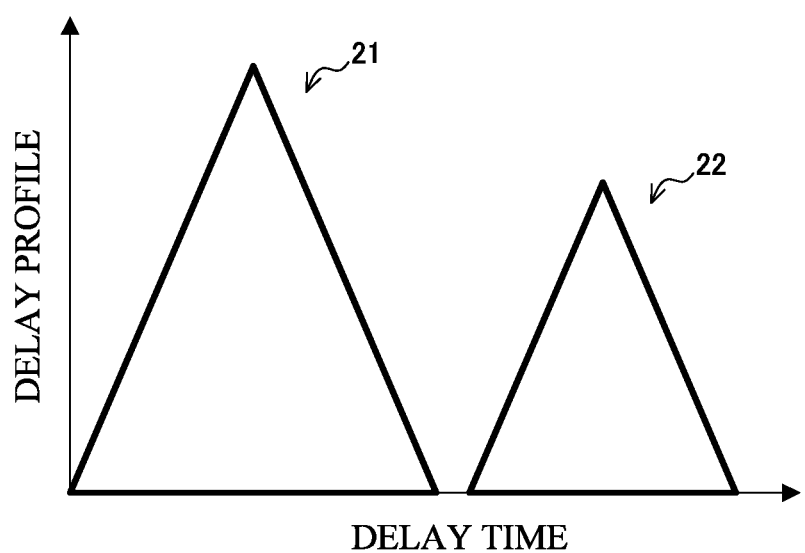
FIG. 6 is a graph illustrating an example of a CIR according to the embodiment.

FIG. 6 illustrates an example of the CIR output from the integrator 219. FIG. 6 is a graph illustrating the example of the CIR according to the present embodiment. The CIR illustrated in FIG. 6 is a CIR obtained on an assumption that the count start time of the time counter is time when the transmitter has transmitted the transmission signal. Such a CIR is also referred to as delay profile. The graph includes a horizontal axis representing delay time. The delay time is time elapsed after the time when the transmitter has transmitted the transmission signal. The graph includes a vertical axis representing absolute values of CIR values (such as electric power value). Note that, hereinafter, description will be given on an assumption that the CIR means the delay profile.

A piece of information included in information that changes chronologically, such as a CIR value obtained at a certain delay time with regard to the CIR, is also referred to as a sampling point. Typically, a set of sampling points obtained between a zero-crossing and another zero-crossing corresponds to a single pulse with regard to the CIR. The CIR illustrated in FIG. 6 includes a set 21 of sampling points corresponding to a certain pulse, and a set 22 of sampling points corresponding to another pulse.

For example, the set 21 corresponds to a signal (such as pulse) that reaches the receiver through a first path. The first path is a shortest path between the transmitter and the receiver. In an environment that includes no obstacle, the first path is a straight path between the transmitter and the receiver. For example, the set 22 corresponds to a signal (such as pulse) that reaches the receiver through a path other than the first path. As described above, the signals that have passed through different paths are also referred to as multipath waves.

(3) Detection of First Incoming Wave

Among wireless signals received from the transmitter, the receiver detects a signal that meets a predetermined detection standard as a signal that reaches the receiver through the first path. Next, the receiver estimates the positional parameters on the basis of the detected signal.

Hereinafter, the signal detected as the signal that reaches the receiver through the first path is also referred to as the first incoming wave. The first incoming wave may be any of a direct wave, a delayed wave, or a combined wave. The direct wave is a signal that passes through a shortest path between the transmitter and the receiver, and is directly received by the receiver (that is, without being reflected or the like). In other words, the direct wave is a signal that reaches the receiver through the first path. The delayed wave is a signal that passes through a path other than the shortest path between the transmitter and the receiver, and is indirectly received by the receiver through reflection or the like. The delayed wave is received by the receiver after getting delayed in comparison with the direct wave. The combined wave is a signal received by the receiver in a state of combining a plurality of signals that have passed through a plurality of different paths.

The receiver detects a signal that meets a predetermined detection standard as the first incoming wave, among wireless signals received from the transmitter. For example, the predetermined detection standard is a condition that an electric power value of the CIR exceeds a predetermined threshold for the first time. In other words, the receiver may detects a pulse corresponding to a portion of the CIR obtained when the electric power value exceeds the predetermined threshold for the first time, as the first incoming wave. For another example, the predetermined detection standard is a condition that a reception electric power value of the received wireless signal (that is, the sum of squares of an I component and a Q component of the received signal) exceeds a predetermined threshold for the first time. In other words, the receiver may detect a signal whose electric power value exceeds the predetermined threshold for the first time, as the first incoming wave among reception signals.

Here, it should be noted that the signal detected as the first incoming wave is not necessarily the direct wave. For example, if the direct wave is received in a state where the direct wave and the delayed wave annihilate each other, sometimes the electric power value of the CIR falls below the predetermined threshold and the direct wave is not detected as the first incoming wave. In this case, the combined wave or the delayed wave coming while being delayed behind the direct wave is detected as the first incoming wave.

<2.3. Estimation of Positional Parameter>

(1) Distance Estimation

The communication unit 200 performs the ranging process. The ranging process is a process of estimating a distance between the communication unit 200 and the portable device 100. For example, the distance between the communication unit 200 and the portable device 100 is the distance R illustrated in FIG. 3. The ranging process includes transmission/reception of a ranging signal and calculation of the distance R based on propagation delay time of the ranging signal. The propagation delay time is time from transmission to reception of the signal.

Here, the ranging signal is transmitted/received by one of the plurality of wireless communication sections 210 of the communication unit 200. Hereinafter, the wireless communication section 210 that transmits/receives the ranging signal is also referred to as a master. The distance R is a distance between the wireless communication section 210 serving as the master (more precisely, the antenna 211) and the portable device 100.

In the ranging process, a plurality of the ranging signals may be transmitted and received between communication unit 200 and the portable device 100. Among the plurality of ranging signals, a ranging signal transmitted from one device to the other device is also referred to as a first ranging signal. Next, a ranging signal transmitted as a response to the first ranging signal from the device that has received the first ranging signal to the device that has transmitted the first ranging signal is also referred to as a second ranging signal. In addition, a ranging signal transmitted as a response to the second ranging signal from the device that has received the second ranging signal to the device that has transmitted the second ranging signal is also referred to as a third ranging signal.

Next, with reference to FIG. 7, an example of a flow of the ranging process will be described.

Figure 7:
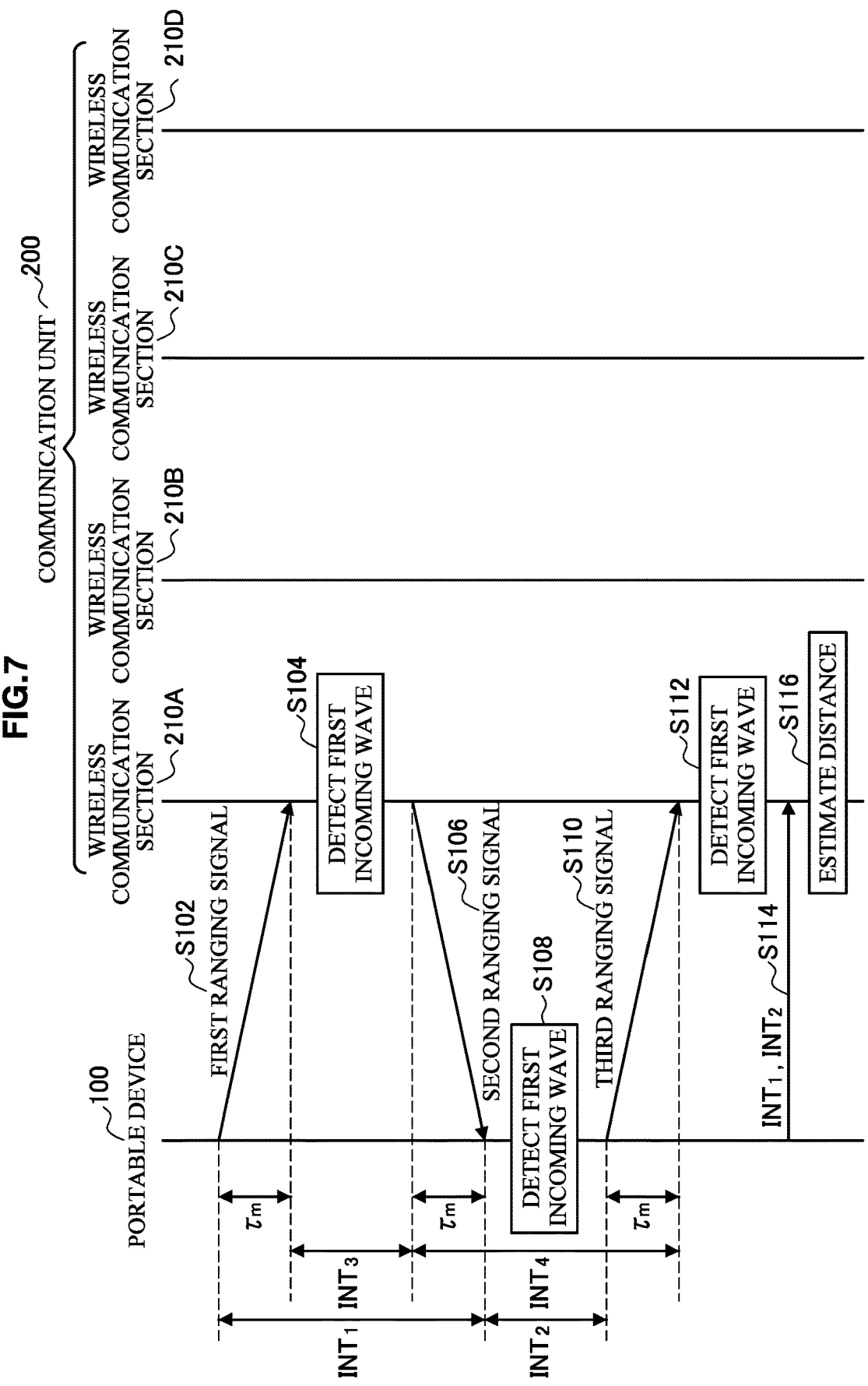
FIG. 7 is a sequence diagram illustrating an example of a flow of a ranging process executed in the system according to the embodiment.

FIG. 7 is a sequence diagram illustrating the example of the flow of the ranging process executed in the system 1 according to the present embodiment. The portable device 100 and the communication unit 200 are involved in this sequence. It is assumed that the wireless communication section 210A functions as the master in this sequence.

As illustrated in FIG. 7, the portable device 100 first transmits the first ranging signal (Step S102). When the wireless communication section 210A receives the first ranging signal, the control section 230 calculates a CIR of the first ranging signal. Next, the control section 230 detects a first incoming wave of the first ranging signal of the wireless communication section 210A on the basis of the calculated CIR (Step S104).

Next, the wireless communication section 210A transmits the second ranging signal in response to the first ranging signal (Step S106). When the second ranging signal is received, the portable device 100 calculates a CIR of the second ranging signal. Next, the portable device 100 detects a first incoming wave of the second ranging signal on the basis of the calculated CIR (Step S108).

Next, the portable device 100 transmits the third ranging signal in response to the second ranging signal (Step S110). When the wireless communication section 210A receives the third ranging signal, the control section 230 calculates a CIR of the third ranging signal. Next, the control section 230 detects a first incoming wave of the third ranging signal of the wireless communication section 210A on the basis of the calculated CIR (Step S112).

The portable device 100 measures an interval $INT_1$ from transmission time of the first ranging signal to reception time of the second ranging signal, and an interval $INT_2$ from reception time of the second ranging signal to transmission time of the third ranging signal. Here, the reception time of the second ranging signal is reception time of the first incoming wave of the second ranging signal detected in Step S108. Next, the portable device 100 transmits a signal including information indicating the interval $INT_1$ and the interval $INT_2$ (Step S114). For example, such a signal is received by the wireless communication section 210A.

The control section 230 measures an interval $INT_3$ from reception time of the first ranging signal to transmission time of the second ranging signal, and an interval $INT_4$ from transmission time of the second ranging signal to reception time of the third ranging signal. Here, the reception time of the first ranging signal is reception time of the first incoming wave of the first ranging signal detected in Step S104. In a similar way, the reception time of the third ranging signal is reception time of the first incoming wave of the third ranging signal detected in Step S112.

Next, the control section 230 estimates the distance R on the basis of the intervals $INT_1$, $INT_2$, $INT_3$, and $INT_4$ (Step S116). For example, the control section 230 estimates propagation delay time $\tau_m$ by using an equation listed below.

$$\tau_m = \frac{INT_1 \times INT_4 - INT_2 \times INT_3}{INT_1 + INT_2 + INT_3 + INT_4} \quad (1)$$

Next, the control section 230 estimates the distance R by multiplying the estimated propagation delay time $\tau_m$ by speed of the signal.

Cause of Reduction in Accuracy of Estimation

The reception times of the ranging signals serving as start or end of the intervals $INT_1$, $INT_2$, $INT_3$, and $INT_4$ are reception times of the first incoming waves of the ranging signals. As described above, the signal detected as the first incoming wave is not necessarily the direct wave.

In the case where the combined wave or the delayed wave coming while being delayed behind the direct wave is detected as the first incoming wave, reception time of the first incoming wave is delayed in comparison with the case where the direct wave is detected as the first incoming wave. In this case, an estimation result of the propagation delay time $\tau_m$ is changed from a true value (an estimation result of propagation delay time $\tau_m$ obtained in the case where the direct wave is detected as the first incoming wave). In addition, this change deteriorates the accuracy of ranging.

Supplement

Note that, the receiver may treat the time of meeting the predetermined detection standard as the time of receiving the first incoming wave. In other words, the receiver may treat time when the electric power value of the CIR exceeds the predetermined threshold for the first time or time when the reception electric power value of the wireless signal exceeds the predetermined threshold for the first time, as the time of receiving the first incoming wave. Alternatively, the receiver may treat time of a peak of the detected first incoming wave (that is, time when the highest electric power value is obtained with regard to a portion of the CIR corresponding to the first incoming wave, or time when the highest reception electric power value is obtained with regard to the first incoming wave), as the time of receiving the first incoming wave.

(2) Angle Estimation

The communication unit 200 performs the angle estimation process. The angle estimation process is a process of estimating the angles α and β illustrated in FIG. 3. The angle estimation process includes reception of an angle estimation signal and calculation of the angles α and β on the basis of a result of reception of the angle estimation signal. The angle estimation signal is a signal transmitted and received in the angle estimation process. Next, with reference to FIG. 8, an example of a flow of the angle estimation process will be described.

Figure 8:
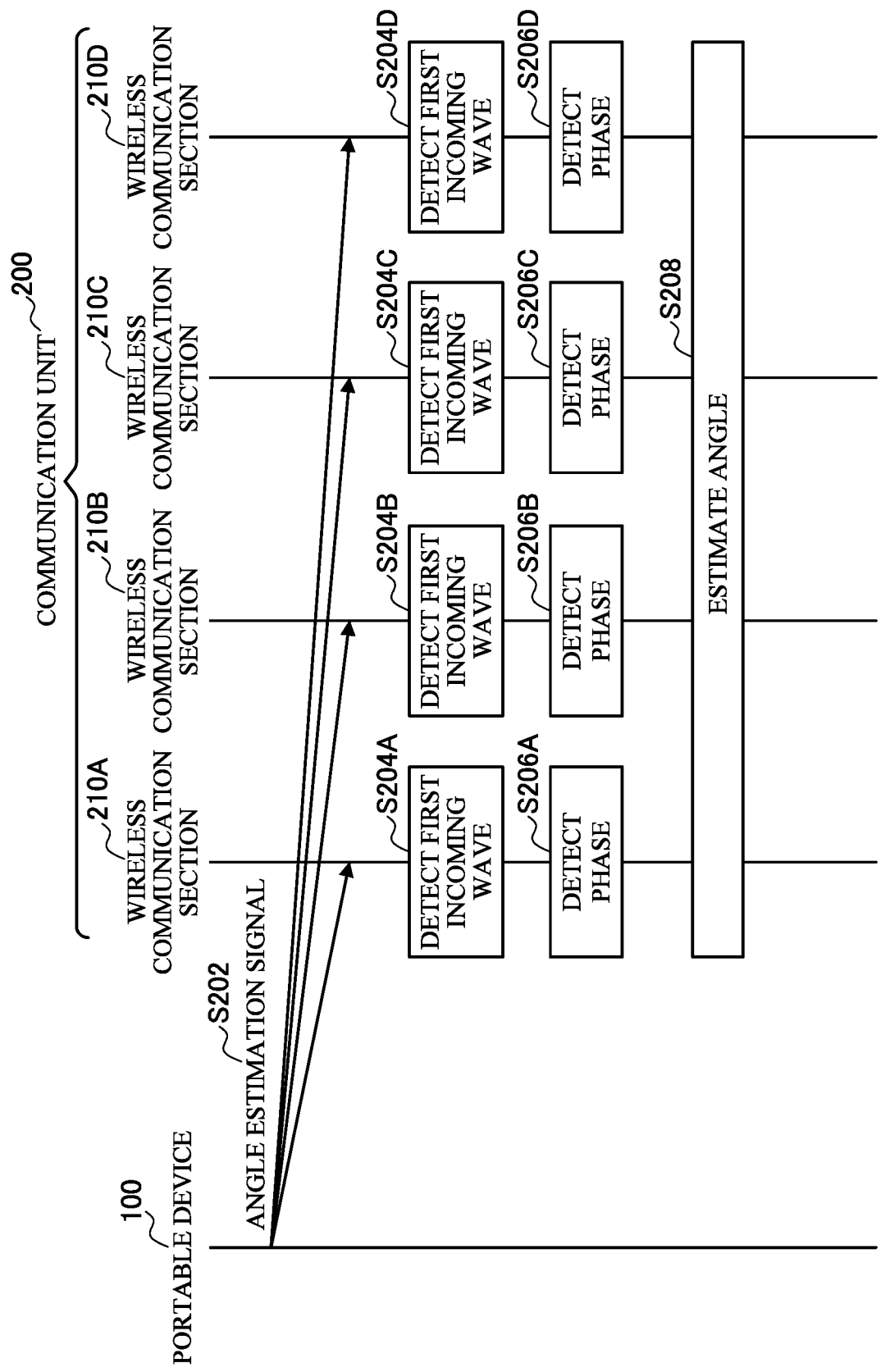
FIG. 8 is a sequence diagram illustrating an example of a flow of an angle estimation process executed in the system according to the embodiment.

FIG. 8 is a sequence diagram illustrating the example of the flow of the angle estimation process executed in the system 1 according to the present embodiment. The portable device 100 and the communication unit 200 are involved in this sequence.

As illustrated in FIG. 8, the portable device 100 first transmits the angle estimation signal (Step S202). Next, when the wireless communication sections 210A to 210D receive respective angle estimation signals, the control section 230 calculates CIRs of the respective angle estimation signals received by the wireless communication sections 210A to 210D. Next, the control section 230 detects first incoming waves of the respective angle estimation signals on the basis of the calculated CIRs with regard to the wireless communication sections 210A to 210D (Step S204A to Step S204D). Next, the control section 230 detects respective phases of the detected first incoming waves with regard to the wireless communication sections 210A to 210D (Step S206A to Step S206D). Next, the control section 230 estimates the angles α and β on the basis of the respective phases of the detected first incoming waves with regard to the wireless communication sections 210A to 210D (Step S208).

Here, the phase of the first incoming wave may be phase obtained at the reception time of the first incoming wave among the CIR. Alternatively, the phase of the first incoming wave may be phase obtained at time of the reception time of the first incoming wave among the received wireless signals.

Next, details of a process in Step S208 will be described. $P_A$ represents the phase of the first incoming wave detected with regard to the wireless communication section 210A. $P_B$ represents the phase of the first incoming wave detected with regard to the wireless communication section 210B. $P_C$ represents the phase of the first incoming wave detected with regard to the wireless communication section 210C. $P_D$ represents the phase of the first incoming wave detected with regard to the wireless communication section 210D. In this case, antenna array phase differences $Pd_{AC}$ and $Pd_{BD}$ in the X axis direction and antenna array phase differences $Pd_{BA}$ and $Pd_{DC}$ in the Y axis direction are expressed in respective equations listed below.

$$Pd_{AC}=(P_A-P_C)$$

$$Pd_{BD}=(P_B-P_D)$$

$$Pd_{DC}=(P_D-P_C)$$

$$Pd_{BA}=(P_B-P_A) \quad (2)$$

The angles α and β are calculated by using the following equation. Here, λ represents wavelength of a radio wave, and d represents a distance between antennas 211.

$$\alpha \text{ or } \beta=\arccos(\lambda \cdot Pd/(2\cdot\pi\cdot d)) \quad (3)$$

Therefore, respective equations listed below represent angles calculated on the basis of the respective antenna array phase differences.

$$\alpha_{AC}=\arccos(\lambda \cdot Pd_{AC}/(2\cdot\pi\cdot d))$$

$$\alpha_{BD}=\arccos(\lambda \cdot Pd_{BD}/(2\cdot\pi\cdot d))$$

$$\beta_{DC}=\arccos(\lambda \cdot Pd_{DC}/(2\cdot\pi\cdot d))$$

$$\beta_{BA}=\arccos(\lambda \cdot Pd_{BA}/(2\cdot\pi\cdot d)) \quad (4)$$

The control section 230 calculates the angles α and β on the basis of the calculated angles $\alpha_{AC}$, $\alpha_{BD}$, $\beta_{DC}$, and $\beta_{BA}$. For example, as expressed in the following equations, the control section 230 calculates the angles α and β by averaging the angles calculated with regard to the two respective arrays in the X axis direction and the Y axis direction.

$$\alpha=(\alpha_{AC}+\alpha_{BD})/2$$

$$\beta=(\beta_{DC}+\beta_{BA})/2 \quad (5)$$

Cause of Reduction in Accuracy of Estimation

As described above, the angles α and β are calculated on the basis of the phases of the first incoming waves. As described above, the signal detected as the first incoming wave is not necessarily the direct wave.

In other words, sometimes the delayed wave or the combined wave may be detected as the first incoming wave. Typically, phases of the delayed wave and the combined wave are different from the phase of the direct wave. This difference deteriorates accuracy of angle estimation.

Supplement

Note that, the angle estimation signal may be the same as the ranging signal. For example, the third ranging signal illustrated in FIG. 7 may be the same as the angle estimation signal illustrated in FIG. 8. In this case, it is possible for the communication unit 200 to calculate the distance R, the angle α, and the angle β by receiving a single wireless signal that serves as both the angle estimation signal and the third ranging signal.

(3) Coordinate Estimation

The control section 230 performs a coordinate estimation process. The coordinate estimation process is a process of estimating three-dimensional coordinates (x, y, z) of the portable device 100 illustrated in FIG. 4. As the coordinate estimation process, a first calculation method and a second calculation method listed below may be adopted.

First Calculation Method

The first calculation method is a method of calculating the coordinates x, y, and z on the basis of results of the ranging process and the angle estimation process. In this case, the control section 230 first calculates the coordinates x and y by using equations listed below.

$$x=R\cdot\cos\alpha$$

$$y=R\cdot\cos\beta \quad (6)$$

Here, the distance R, the coordinate x, the coordinate y, and the coordinate z have a relation represented by an equation listed below.

$$R=\sqrt{x^2+y^2+z^2} \quad (7)$$

The control section 230 calculates the coordinate z by using the above-described relation and an equation listed below.

$$z=\sqrt{R^2-R^2\cdot\cos^2\alpha-R\cdot\cos^2\beta} \quad (8)$$

Second Calculation Method

The second calculation method is a method of calculating the coordinates x, y, and z while omitting estimation of the angles α and β. First, the above-listed equations (4), (5), (6), and (7) establish a relation represented by equations listed below.

$$x/R=\cos\alpha \quad (9)$$

$$y/R=\cos\beta \quad (10)$$

$$x^2+y^2+z^2=R^2 \quad (11)$$

$$d\cdot\cos\alpha=\lambda\cdot(Pd_{AC}/2+Pd_{BD}/2)/(2\cdot\pi) \quad (12)$$

$$d\cdot\cos\beta=\lambda\cdot(Pd_{DC}/2+Pd_{BA}/2)/(2\cdot\pi) \quad (13)$$

The equation (12) is rearranged for cos α, and cos α is substituted into the equation (9). This makes it possible to obtain the coordinate x by using an equation listed below.

$$x=R\cdot\lambda\cdot(Pd_{AC}/2+Pd_{BD}/2)/(2\cdot\pi\cdot d) \quad (14)$$

The equation (13) is rearranged for cos β, and cos β is substituted into the equation (10). This makes it possible to obtain the coordinate y by using an equation listed below.

$$y = R \cdot \lambda \cdot (Pd_{DC}/2 + Pd_{BA}/2)/(2 \cdot \pi \cdot d) \quad (15)$$

Next, the equation (14) and the equation (15) are substituted into the equation (11), and the equation (11) is rearranged. This makes it possible to obtain the coordinate z by using an equation listed below.

$$z = \sqrt{R^2 - x^2 - y^2} \quad (16)$$

The process of estimating the coordinates of the portable device 100 in the local coordinate system has been described above. It is possible to estimate coordinates of the portable device 100 in the global coordinate system by combining the coordinates of the portable device 100 in the local coordinate system and coordinates of the origin in the local coordinate system relative to the global coordinate system.

Cause of Reduction in Accuracy of Estimation

As described above, the coordinates are calculated on the basis of the propagation delay time and phases. In addition, they are estimated on the basis of the first incoming waves. Therefore, accuracy of estimating the coordinates may deteriorate in a way similar to the ranging process and the angle estimation process.

(4) Estimation of Existence Region

The positional parameters may include a region including the portable device 100 among a plurality of predefined regions. For example, in the case where the region is defined by a distance from the communication unit 200, the control section 230 estimates the region including the portable device 100 on the basis of the distance R estimated through the ranging process. For another example, in the case where the region is defined by an angle with respect to the communication unit 200, the control section 230 estimates the region including the portable device 100 on the basis of the angles α and β estimated through the angle estimation process. For another example, in the case where the region is defined by the three-dimensional coordinates, the control section 230 estimates the region including the portable device 100 on the basis of the coordinates (x, y, z) estimated through the coordinate estimation process.

Alternatively, in a process specific to the vehicle 202, the control section 230 may estimate the region including the portable device 100 among the plurality of regions including the vehicle interior and the vehicle exterior of the vehicle 202. This makes it possible to provide courteous service such as providing different serves in the case where the user is in the vehicle interior and in the case where the user is in the vehicle exterior. In addition, the control section 230 may estimate the region including the portable device 100 among nearby region and faraway region. The nearby region is a region within a predetermined distance from the vehicle 202, and the faraway region is the predetermined distance or more away from the vehicle 202.

(5) Use pf Result of Estimating Positional Parameter

For example, a result of estimating the positional parameter may be used for authentication of the portable device 100. For example, the control section 230 determines that the authentication is successful and unlock a door in the case where the portable device 100 is in an area close to the communication unit 200 on a driver seat side.

3. Technical Problem

Technical problems to be solved by the present embodiment will be described with reference to FIG. 9 to FIG. 12.

FIG. 9 to FIG. 12 are graphs for describing the technical problems to be solved by the present embodiment. The graph includes a horizontal axis representing a chip length that indicates the delay time, and a vertical axis representing absolute values of CIR values (such as electric power values). The chip length is duration of a single pulse. For example, in the case of forming a pulse with a bandwidth of 500 MHz, the chip length is a pulse width of approximate 2 ns.

Figure 9:
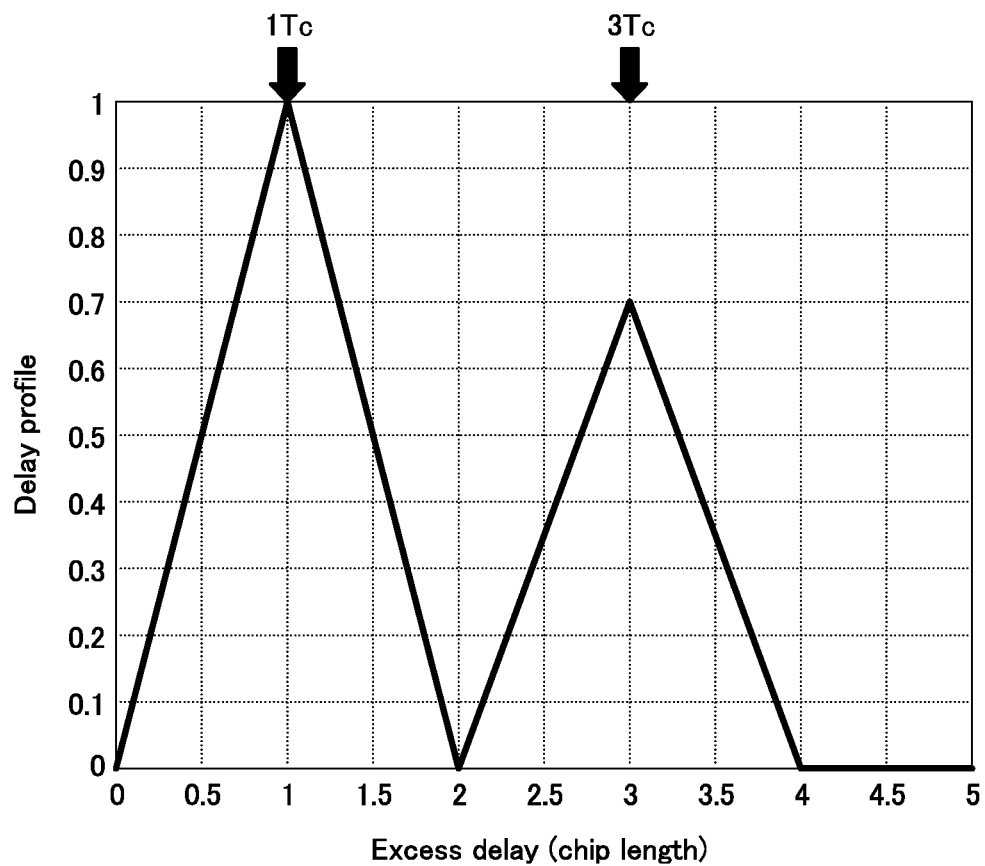
FIG. 9 is a graph for describing a technical problem to be solved by the embodiment.

FIG. 9 illustrates a CIR obtained in the case where a signal passed through a first path arrives at a delay time $1T_C$ and a signal passed through a path other than the first path arrives at a delay time $3T_C$. With reference to FIG. 9, the CIR waveform includes peaks at the respective delay times $1T_C$ and $3T_C$. Accordingly, it is understood that this CIR waveform sufficiently achieves separation of two multipath waves whose delay times are different by $2T_C$.

Figure 10:
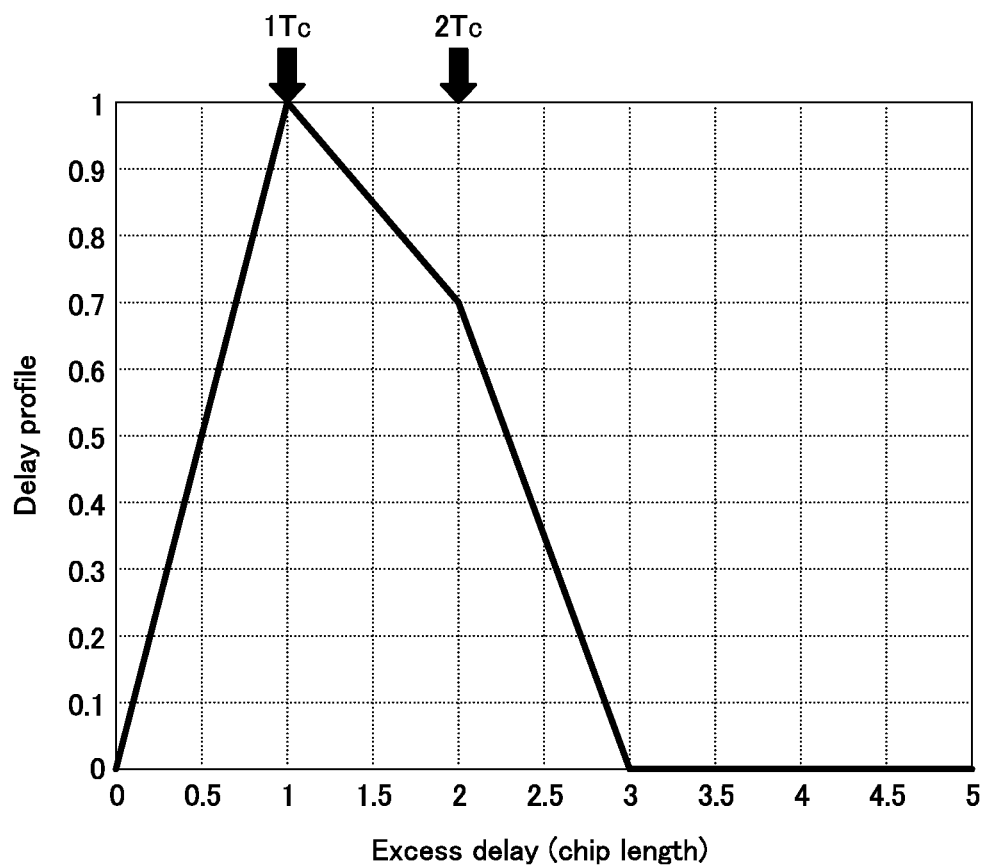
FIG. 10 is a graph for describing a technical problem to be solved by the embodiment.

FIG. 10 illustrates a CIR obtained in the case where a signal passed through a first path arrives at a delay time $1T_C$ and a signal passed through a path other than the first path arrives at a delay time $2T_C$. Note that, a phase of a signal of a first wave arriving at the delay time $1T_C$ is same as a phase of a signal of a second wave arriving at the delay time $2T_C$. With reference to FIG. 10, the CIR waveform includes a peak at the delay time $1T_C$, but does not include a peak at the delay time $2T_C$. In addition, the signal arriving at the delay time $1T_C$ and the signal arriving at the delay time $2T_C$ are combined in the same phase and appear as a single waveform. Accordingly, it is understood that it is difficult for this CIR waveform to separate two multipath waves whose delay times are different by $1T_C$.

Figure 11:
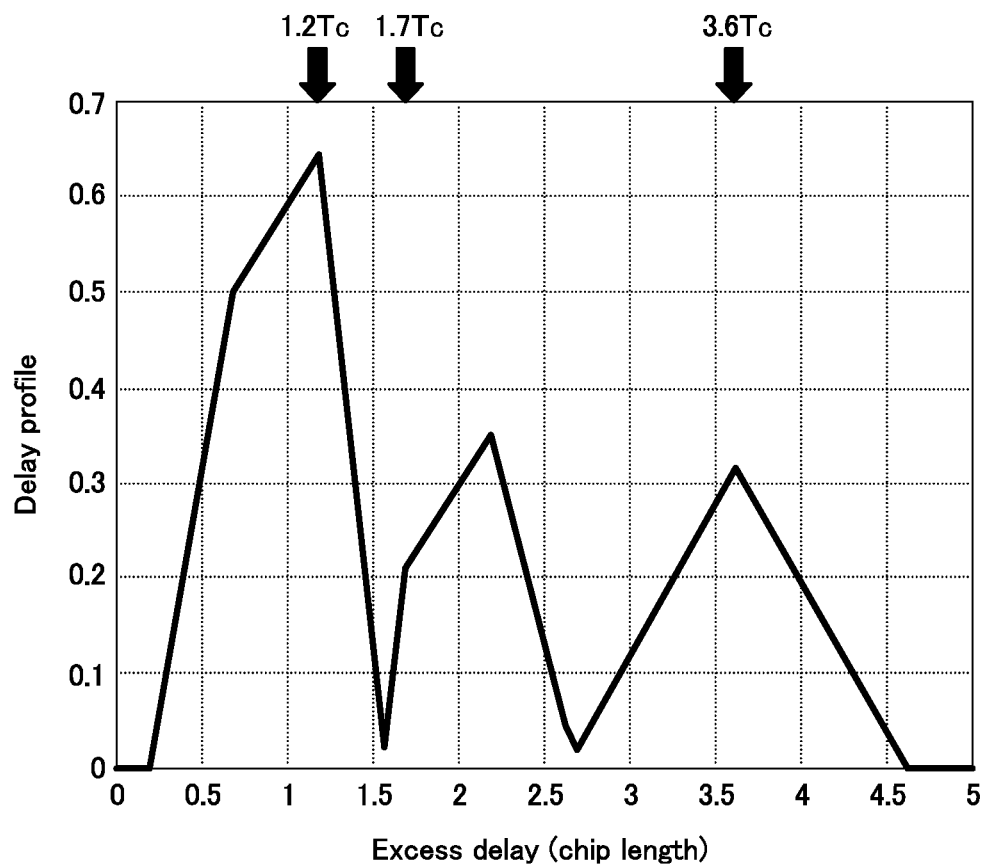
FIG. 11 is a graph for describing a technical problem to be solved by the embodiment.

FIG. 11 illustrates a CIR obtained in the case where a signal passed through a first path arrives at a delay time $1.2T_C$ and signals passed through paths other than the first path arrives at a delay time $1.7T_C$ and a delay time $3.6T_C$. Note that, a phase of a signal of a first wave arriving at the delay time $1.2T_C$ is reverse of a phase of a signal of a second wave arriving at the delay time $1.7T_C$. With reference to FIG. 11, the CIR waveform includes peaks at the respective delay times $1.2T_C$ and $3.6T_C$. On the other hand, a second peak rises near a delay time $2.2T_C$. The second peak is drastically deviated from a true delay time $1.7T_C$. Accordingly, it is understood that it is difficult for this CIR waveform to separate two multipath waves whose delay times are different by $0.5T_C$.

In the case where a difference between the delay times of the two multipath waves arriving at the receiver is short as illustrated in FIG. 10 and FIG. 11, the delay time at which a peak rises may be changed from an original delay time in the CIR waveform. Therefore, a delay time detected as the reception time of the first incoming wave may be changed from the original delay time. In this case, this change deteriorates the accuracy of ranging.

Figure 12:
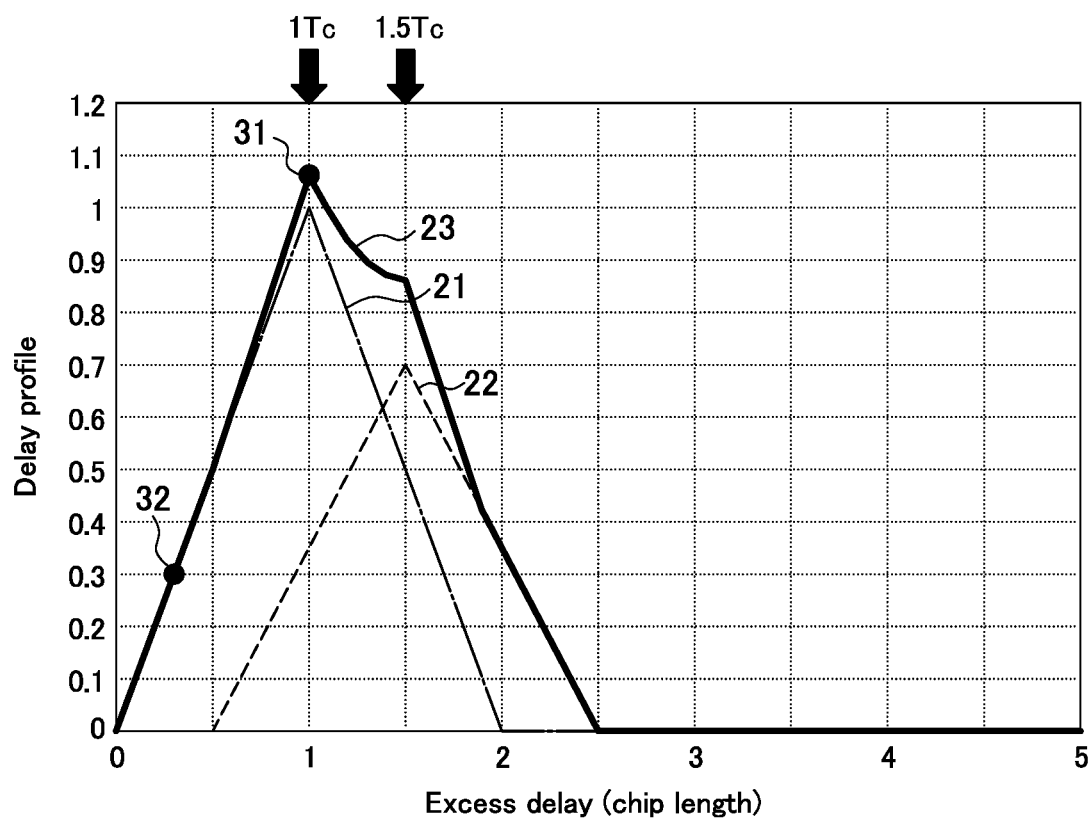
FIG. 12 is a graph for describing a technical problem to be solved by the embodiment.

FIG. 12 illustrates a CIR waveform 23 obtained in the case where a signal passed through a first path arrives at a delay time $1T_C$ and a signal passed through a path other than the first path arrives at a delay time $1.5T_C$. A CIR waveform 21 is a CIR waveform obtained in the case where a signal passed through a first path is received alone at the delay time $1T_C$. A CIR waveform 22 is a CIR waveform obtained in the case where a signal passed through a path other than the first path is received alone at the delay time $1.5T_C$. Note that, a phase of a signal of a first wave arriving at the delay time $1T_C$ is different from a phase of a signal of a second wave arriving at the delay time $2T_C$ by 90 degrees.

In the case where the difference between the delay times of the two multipath waves arriving at the receiver is short, sometimes the delayed wave or the combined wave may be detected as the first incoming wave. In the example illustrated in FIG. 12, the combined wave is detected as the first incoming wave. Typically, phases of the delayed wave and the combined wave are different from the phase of the direct wave. This difference deteriorates accuracy of angle estimation.

In the case where the combined wave obtained by combining the direct wave and the delayed wave is detected as the first incoming wave as illustrated in FIG. 12, the delayed wave is combined and a phase is drastically changed at a sampling point 31 near a peak. Accordingly, accuracy of estimation deteriorates if an angle is estimated on the basis of the phase of the sampling point 31.

On the other hand, the delayed wave is less influential at a sampling point with lower electric power before the peak such as a sampling point 32, change in the phase becomes small. However, the electric power value is reduced in exchange for reduction in the influence of the delayed wave. This increases influence of noise, and the accuracy of estimation is reduced by this increase.

Therefore, it is desirable to separate the multipath waves with higher resolution than the CIR.

4. Technical Features

<4.1 Detection of First Incoming Wave>

The portable device 100 and the communication unit 200 detects the first incoming wave through a process to be described in detail below. Hereinafter, for example, a case where the communication unit 200 serves as a detector of the first incoming wave will be described. The process to be described below may be executed by the portable device 100.

(1) Formulation of Delay Profile

First the delay profile (that is, CIR) is formulated through a pseudo-noise (PN) correlation method. The PN correlation method is a method of transmitting a signal including a random sequence such as a PN series signal shared between the transmitter and the receiver and calculating a CIR by correlating a transmission signal with a reception signal through sliding correlation. Note that, the PN series signal is a signal including 1 and 0 that are randomly arranged.

Hereinafter, it is assumed that a PN series signal u(t) of unit amplitude is transmitted as the transmission signal (for example, preamble symbol of angle estimation signal and ranging signal). The unit amplitude is designated amplitude that is known by the transmitter and the receiver.

In addition, hereinafter, it is assumed that an antenna of the receiver receives multipath waves of L waves as signals corresponding to a transmission signal transmitted from the transmitter. The multipath waves are signals that pass through a plurality of paths and is received by the receiver. In other words, when the transmitter transmits the single signal, the receiver receives L number of signals passed through the plurality of paths.

In this case, the reception signal x(t) is expressed in an equation listed below.

$$x(t) = \sum_{i=1}^{L} h_i u(t - T_{0i}) e^{-j2\pi f T_{0i}} + v(t) \tag{17}$$

Here, t is time, $h_i$ is a complex response value of an i-th multipath wave, $T_{0i}$ is propagation delay time of the i-th multipath wave, f is frequency of a carrier wave of the transmission signal, and v(t) is internal noise. The internal noise is noise generated inside a circuit of the receiver.

For example, as expressed in an equation listed below, the reception signal x(t) is correlated with a transmission signal u(t) through the PN correlation method by shifting time of the transmission signal u(t), which is known by the receiver.

$$z(\tau) = \frac{1}{T} \int_0^T u^*(t - \tau) x(t) dt \tag{18}$$

Note that, u*( ) is complex conjugate of u( ).

z(τ) is also referred to as the delay profile. In addition, $|z(\tau)|^2$ is also referred to as power delay profile. τ is delay time.

The delay profile of the multipath waves of the L waves is expressed in an equation listed below.

$$z(t) = \sum_{i=1}^{L} h_i e^{-j2\pi f T_{0i}} r(\tau - T_{0i}) + n(\tau) \tag{19}$$

Here, r(τ) is an autocorrelation function of the PN series signal. The autocorrelation function is a function of correlating a signal with the signal itself. r(τ) is given by an equation listed below.

$$r(\tau) = \frac{1}{T} \int_0^T u^*(t - \tau) u(t) dt \tag{20}$$

In addition, n(τ) is an internal noise component. n(τ) is given by an equation listed below.

$$n(\tau) = \int_0^T u^*(t-\tau) v(t) dt \tag{21}$$

(2) Sparse Reconstruction

The number of samples of the reception signal is assumed to be M (where M>L). In addition, it is assumed that the reception signal is sampled at M number of discrete delay times $\tau_1, \tau_2, \ldots,$ and $\tau_M$. Note that, the discrete delay times express delay times as discrete values. z(τ) is the delay profile calculated on the basis of the reception signal sampled at the discrete delay time τ. A data vector z including the M number of delay profiles is expressed in an equation listed below. Note that, the equation listed below indicates a case where the receiver receives only one preamble symbol.

$$z = [z(\tau_1), z(\tau_2), \ldots, z(\tau_M)]^T \tag{22}$$

In the case where the multipath waves of the L waves are received, the data vector z is expressed in equations listed below.

$$z = \sum_{i=1}^{L} h_i e^{-j2\pi f T_{0i}} r(T_{0i}) + n \tag{23}$$

$$r(\tau) = [r(\tau_1 - \tau), r(\tau_2 - \tau), \ldots, r(\tau_M - \tau)]^T \tag{24}$$

$$n = [n(\tau_1), n(\tau_2), \ldots, n(\tau_M)]^T \tag{25}$$

Note that, r(τ) is referred to as a mode vector.

In addition, the data vector z is expressed in equations listed below as a matrix expression.

$$z = A_0 s_0 + n \in \mathbb{C}^M \quad (26)$$

$$A_0 = [r(T_{01}), r(T_{02}), \ldots, r(T_{0L})] \in \mathbb{C}^{M \times L} \quad (27)$$

$$s_0 = [h_1 e^{-j2\pi f T_{01}}, h_2 e^{-j2\pi f T_{02}}, \ldots, h_L e^{-j2\pi f T_{0L}}]^T \in \mathbb{C}^L \quad (28)$$

Here, $A_0$ is also referred to as a modal matrix.

In addition, $S_0$ is also referred to as a signal vector.

Through sparse reconstruction, the data vector z is converted into a format including a matrix product of A and s.

$$z = As + n \in \mathbb{C}^M \quad (29)$$

$$A = [r(\tau_1), r(\tau_2), \ldots, r(T_N)] \in \mathbb{C}^{M \times N} \quad (30)$$

$$s = [s_1, s_2, \ldots, s_N]^T \in \mathbb{C}^N \quad (31)$$

$T_1, T_2, \ldots, T_N$ represents N number of delay times, which are search targets. $T_1, T_2, \ldots, T_N$ are also referred to as delay time bins. A delay time bin is an example of set time. Note that, N>>L.

Here, A is also referred to as an expanded modal matrix. The expanded modal matrix is a matrix including a plurality of elements indicating the delay profile obtained on an assumption that respective signals are received in a plurality of delay time bins. For example, $r(T_1)$ that is an element of the expanded modal matrix A is delay profile of a signal obtained on an assumption that the signal is received at time $T_1$.

In addition, S is also referred to as an expanded signal vector. The expanded signal vector is a vector including a plurality of element, each of which indicates whether or not there is a signal received in each delay time bin and amplitude and a phase of the signal.

(3) Estimation of Propagation Delay Time Based on Expanded Signal Vector

By using the sparse reconstruction, delay profile z is modeled in a format of As+n. This makes it possible to find the expanded signal vector x by solving an underdetermined problem where an unknown number is N and a condition number is M (where M<N). The control section 230 estimates reception time of the first incoming wave on the basis of the delay time bins corresponding to the plurality of elements of the expanded signal vector s.

Here, nonzero elements of the expanded signal vector indicate that there are signals in the delay time bins corresponding to the nonzero elements. On the other hand, zero elements of the expanded signal vector indicate that there is no signal in the delay time bins corresponding to the zero elements. Therefore, the control section 230 estimates the delay time bin corresponding to the nonzero element as reception time of the first incoming wave among the delay time bins corresponding to the plurality of elements of the expanded signal vector s.

At this time, the control section 230 estimates a sparse solution of the expanded signal vector s and estimates the delay time bin corresponding to the nonzero element of the sparse solution as reception time of the first incoming wave. The sparse solution is a vector including a predetermined number of the nonzero elements. The predetermined number is a number of pulses included in the reception signal as pulses corresponding to the single pulse included in the transmission signal. In other words, in the case where the multipath waves of the L waves are received, the sparse solution include L number of nonzero elements and the other elements in the sparse solution are zero. For example, in the case where $s_2$ is the nonzero element in $s = [s_1, s_2, \ldots, s_N]$, it is determined that a signal is received at a delay time $T_2$.

In particular, the control section 230 estimates a delay time bin corresponding to an earliest delay time bin as a reception time of the first incoming wave among the delay time bins corresponding to nonzero elements included in the elements of the expanded signal vector s. For example, in the case where $s_2$, $s_4$, and $s_6$ are the nonzero elements in $s = [s_1, s_2, \ldots, s_N]$, it is determined that a signal passed through a first path is received at a delay time $T_2$ and signals passed through paths other than the first path are received at delay times $T_4$ and $T_6$.

Resolution of the signal found by a model reconstructed through the sparse reconstruction is decided by magnitude of N used for the modelization in the sparse reconstruction (in other words, the number of elements of the expanded signal vector s). Therefore, by increasing the number of N at the time of the sparse reconstruction, it is possible to separate the multipath waves with resolution finer than the CIR. Accordingly, the present embodiment uses N number of the delay time bins, which is larger than M number of samples of the reception signal. In other words, time intervals between the N number of delay time bins $T_1, T_2, \ldots,$ and $T_N$ are shorter than time intervals between the M number of discrete delay times $\tau_1, \tau_2, \ldots,$ and $\tau_M$. Such a configuration makes it possible to separate the multipath waves with resolution finer than the intervals between samples of the reception signal. As a result, it is possible to find the reception time of the first incoming wave with the resolution finer than the CIR.

(3) Compression Sensing Algorithm

The control section 230 estimates the expanded signal vector s that is the sparse solution by using a compression sensing algorithm. The compression sensing algorithm is an algorithm for assuming that an unknown vector is a sparse vector and estimating the unknown vector on the basis of linear observation of the unknown vector. According to the present embodiment, the expanded signal vector s is an example of the unknown vector. The linear observation is acquisition of a result of multiplying the unknown vector by a coefficient. According to the present embodiment, the expanded modal matrix A is an example of the coefficient. The delay profile z is an example of the linear observation.

Examples of the compression sensing algorithm include a FOcal Underdetermined System Solver (FOCUSS), an iterative shrinkage/thresholding algorithm (ISTA), a fast ISTA (FISTA), and the like. The control section 230 may adopt any of the compression sensing algorithms. Hereinafter, for example, the FOCUSS is used for estimating the expanded signal vector s. The FOCUSS is an algorithm for estimating an initial value of the unknown vector and iteratively estimating the unknown vector by using a generalized inverse matrix and a weighing matrix. By using the FOCUSS, it is possible to accurately estimate the unknown vector with a small number of iterations by using the generalized inverse matrix and the weighting matrix. Details of a basic principle of the FOCUSS are described in a non-patent document: Irina F. Gorodnitsky, Member, IEEE, and Bhaskar D. Rao, "Sparse Signal Reconstruction from Limited Data Using FOCUSS: A Re-weighted Minimum Norm Algorithm", IEEE TRANSACTIONS ON SIGNAL PROCESSING, VOL. 45, NO. 3, MARCH 1997.

A problem of estimating the expanded signal vector s serving as the sparse solution from the delay profile z is the underdetermined problem where an unknown number is N and a condition number is M (where M<N). Therefore, another condition is added to find a solution. Typically, a condition that a norm of the expanded signal vector s is minimized is added to find a minimum norm solution. Note that, the norm is the length of the vector.

Decision of Initial Value $s_0$ of FOCUSS

With regard to the equation (29), the matrix A disappears (in other words, an identity matrix is obtained) when the internal noise n is ignored and the delay profile z is multiplied by an inverse matrix of the expanded modal matrix A. This makes it possible to extract the expanded mode signal vector s. However, there is no inverse matrix of the expanded modal matrix A. Therefore, the minimum norm solution $s_{mn}$ is found by multiplying the delay profile z by a generalized inverse matrix of the expanded modal matrix A as expressed in an equation listed below. The generalized inverse matrix may be a Moore-Penrose generalized inverse matrix.

$$s_{mn} = A^- z = A^H (AA^H)^{-1} z \tag{32}$$

Here, $A^-$ is the generalized inverse matrix of the expanded modal matrix A. The generalized inverse matrix $A^-$ of the expanded modal matrix A is expressed in an equation listed below.

$$A^- = A^H (AA^H)^{-1} \tag{33}$$

Even if the expanded modal matrix A is multiplied by the generalized inverse matrix $A^-$ of the expanded modal matrix A, the expanded modal matrix A does not completely disappear. Therefore, a vector that is similar to the expanded signal vector s serving as the sparse solution is calculated as the minimum norm solution $s_m$. Note that, minimum norm solution $s_{mn}$ is the initial value $s_0$ of the FOUCSS.

Application of FOCUSS

The minimum norm solution $s_{mn}$ is not the sparse solution. Therefore, the control section 230 estimates a weighted minimum norm solution as estimation of the sparse solution of the expanded signal vector s. The weighted minimum norm solution is a vector that minimizes a norm of a vector obtained by weighting the expanded signal vector s. By estimating the weighted minimum norm solution, it is possible to estimate the sparse solution. The weighted minimum norm solution is expressed in an equation listed below.

$$s = W(AW)^- z \tag{34}$$

Here, W is the weighting matrix. Typically, the weighting matrix W is a diagonal matrix. In other words, the problem of finding the weighted minimum norm solution of the expanded signal vector s is expressed in an equation listed bellow.

Find $s = Wq$

Where $q = \mathrm{argmin}\|d\|$ subject to $AWq = z$ (35)

Specifically, the control section 230 estimates the weighted minimum norm solution of the expanded signal vector s by iteratively calculating an equation (36), an equation (37), and an equation (38) in STEP 1 to STEP 3 listed below.

STEP 1:

$$W_k = \mathrm{diag}(|s_{k-1}|) \tag{36}$$

STEP 2:

$$q_k = (AW_k)^- z \tag{37}$$

STEP 3:

$$s_k = W_k q_k \tag{38}$$

Here, k is the number of iterations, $s_k$ is a candidate for the weighted minimum norm solution, and $(AW_k)^-$ is a generalized inverse matrix of $AW_k$. As described above, the initial value of $s_k$ is given by an equation listed below as the minimum norm solution $s_{mn}$.

$$s|_{k=0} = s_{mn} \tag{39}$$

The control section 230 iteratively performs STEP 1 to STEP 3 described above. For example, STEP 1 to STEP 3 may be iteratively performed until $s_k$ converges. For another example, STEP 1 to STEP 3 may be iteratively performed a predetermined number of times. This makes it possible to estimate the expanded signal vector s that is closer to a true value, as the weighted minimum norm solution. Details thereof will be described below.

By using the above-listed equation (37), the equation (38) is converted into an equation listed below.

$$s_k = W_k (AW_k)^- z \tag{40}$$

When the noise n in the equation (29) is ignored, the equation (40) is converted into an equation listed below.

$$s_k = W_k (AW_k)^- As \tag{41}$$

Here, if $W_k(AW_k)^- A$ is a matrix in which s is not changed like the identity matrix, $s_k$ is identical to s. When the weighting matrix $W_k$ is iteratively updated with regard to the FOCUSS and $W_k(AW_k)^- A$ is approximated to the matrix in which s is not changed like the identity matrix, it is possible to estimate the expanded signal vector s as the weighted minimum norm solution, which is closer to the true value.

(4) Singular Value Decomposition

When estimating the expanded signal vector s, the control section 230 may find the generalized inverse matrix $(AW_k)^-$ of $AW_k$ through singular value decomposition. At this time, the control section 230 may find $(AW_k)^-$ by using truncated singular value decomposition (TSVD), for example.

In this case, the control section 230 decomposes $AW_k$ in the equation (37) in STEP 2 listed above into a format including a diagonal matrix through the singular value decomposition, and calculates $(AW_k)^-$. The diagonal matrix includes singular values that are larger than a predetermined threshold. Through the singular value decomposition, $AW_k$ is decomposed as expressed in an equation listed below.

$$AW_k = U_t S_t V_t^H \tag{42}$$

Here, $S_t$ is a diagonal matrix including t number of nonzero singular values. $U_t$ is a matrix including t number of columns of left-singular vectors corresponding to $S_t$. $V_t$ is a matrix including t number of columns of right-singular vectors corresponding to $S_t$. t is a number of dimensions in a signal subspace. The signal subspace is a space including a signal whose electric power is higher than a threshold. Note that, $V_t^H$ is complex conjugate transpose of the matrix $V_t$, and is also referred to as an adjoint matrix of $V_t$. In this case, $(AW_k)^-$ is found by an equation listed below.

$$(AW_k)^- = V_t S_t^{-1} U_t^H \tag{43}$$

Here, $S_t$ includes t dimension number of nonzero singular values in the signal subspace. In other words, $S_t$ is a diagonal matrix including t number of nonzero singular values. t is larger than a predetermined threshold. In addition, t is the same as L, which represents the number of multipath waves. Accordingly, it is possible to reduce influence of noise when the generalized inverse matrix is found by only using the singular values belonging to the signal subspace (in other words, large singular values) as described above. This is because a singular value that does not belong to the signal subspace (in other words, small singular value) correspond to the noise. By reducing the influence of the noise, it is possible to find the generalized inverse matrix stably and accurately even under the influence of the noise.

(5) Regularization

In the above description, the control section 230 founds $(AW_k)^-$ through the singular value decomposition. On the other hand, the control section 230 may perform regularization by using regularized FOCUSS (R-FOCUSS) to find $(AW_k)^-$. At this time, the control section 230 may use an equation (44) listed below instead of the above-listed equation (37) in STEP 2. Note that, $A_k^H$ is complex conjugate transpose of the matrix $A_k$, and is also referred to as an adjoint matrix of $A_k$.

$$q_k = A_k^H (A_k A_k^H)^{-1} Z$$

with $A_k = AW_k$ (44)

However, in the case where $A_k A_k^H$ is not regular in the above-listed equation (44), it is impossible to find an inverse matrix $(A_k A_k^H)^{-1}$. Therefore, the control section 230 may use an equation (45) listed below instead of the above-listed equation (44) in STEP 2.

$$q_k = A_k^H (A_k A_k^H + \alpha 1)^{-1} Z$$

with $A_k = A_k = AW_k$ (45)

Here, $\alpha$ in the equation (45) is a positive infinitesimal. I is an identity matrix. $\alpha$ is also referred to as a regularization parameter. As expression in the above-listed equation (45), it is possible to find an inverse matrix $(A_k A_k^H)^{-1}$ of $A_k A_k^H$ by using the regularization parameter and regularizing $A_k A_k^H + \alpha I$ even in the case where $A_k A_k^H$ is not regular. In addition, by using the regularization parameter, it is possible to easily converge $S_k$. Note that, the above-listed non-patent document also refers to a regularization parameter with regard to FOCUSS.

Note that, it is also possible to use the TSVD to find the inverse matrix $A_k A_k^H)^{-1}$ of $A_k A_k^H$. In this case, the control section 230 decomposes $A_k A_k^H$ in the equation (44) into a format including a diagonal matrix through the singular value decomposition, and calculates $(A_k A_k^H)^{-1}$. The diagonal matrix includes singular values that are larger than a first threshold. $A_k A_k^H$ is decomposed through the singular value decomposition as expressed in an equation listed below.

$$A_k A_k^H = U_t S_t V_t^H$$ (46)

In this case, $(A_k A_k^H)^{-1}$ is found by an equation listed below.

$$(A_k A_k^H)^{-1} = V_t S_t^{-1} U_t^H$$ (47)

Note that, $A_m A_m^H$ is a square matrix. Accordingly, here, the singular value decomposition is also referred to as eigenvalue decomposition. In addition, the TSVD is also referred to as truncated eigen value decomposition (TEVD).

In the above description, the specific example of calculating $(AW_k)^-$ has been described. Note that, in the case of using the singular value decomposition to calculate $(AW_k)^-$, it is possible to eliminate unnecessary singular values, and sometimes calculation time may be reduced. On the other hand, in the case of using the regularization to calculate $(AW_k)^-$, the singular value are not eliminated, and it is expected to obtain an effect of improving the accuracy of estimation.

(6) Threshold Processing

In the FOCUSS, threshold processing may be performed. Here, the threshold processing is a process of substituting 0 for elements that are a predetermined threshold or less. For example, the control section 230 substitutes 0 for the element that is the predetermined threshold or less among elements included in the weighting matrix $W_k$ in the above-listed equation (36) in STEP 1. For example, threshold processing expressed in an equation listed below may be performed in STEP 1.

STEP 1:

$$w_k(i) = \begin{cases} 0 & |s_{k-1}(i)| < 10^{-5} |s_{k-1}(i)|_{max} \\ |s_{k-1}(i)| & \text{otherwise} \end{cases}$$ (48)

Here, $w_k(i)$ is an i-th diagonal component in the weighting matrix $W_k$. $s_{k-1}(i)$ is an i-th component in an expanded signal vector $s_{k-1}$. $|s_{k-1}(i)|_{max}$ is a maximum value among elements including in $s_{k-1}(i)$. $10^{-5}|s_{k-1}(i)|_{max}$ is an example of the threshold.

Through the above-described threshold processing, elements that are less than the threshold is not considered as signals but considered as noise and is converted into zero among the elements of the expanded signal vector s. This makes it possible to converge the expanded signal vector s much faster. In addition, it is possible to easily obtain the sparse solution because the number of nonzero elements are reduced.

(7) Simulation Result

The present inventors performed a simulation by using settings shown in Table 1 listed below. Note that, $T_C$ is chip length. Note that, a simulation result described herein is obtained in the case where $(AW_k)^-$ is found through the singular value decomposition in STEP 2 described above.

TABLE 1

| Simulation Settings | |
| --- | --- |
| Item Name | Set Value |
| Number of Multipath Waves | L = 3 |
| Electric Power | $[|h_2|^2, |h_2|^2, |h_3|^2] = [1, 0.5, 0.1]$ |
| Delay Time | $[T_{01}, T_{02}, T_{03}] = [1.2T_C, 1.7T_C, 3.6T_C]$ |
| Phase | $[\angle h_2, \angle h_2, \angle h_3] = [0, 180, 0]$ (deg) |
| SNR | SNR = $|h_2|^2 / E[|v(t)|^2]$ = 20 dB |
| Delay Time Bin | $[T_\Sigma, \ldots, T_N] = [0, 0.0625T_C, 0.125T_C, \ldots, 5T_C]$ (N = 81) |
| Sampling Timing | $\tau_\Sigma = 0, \tau_2 = 0.25T_C, \ldots, \tau_M = 5T_C$ (M = 21) |
| Number of Iterations of FOCUSS | 10 |

Figure 13:
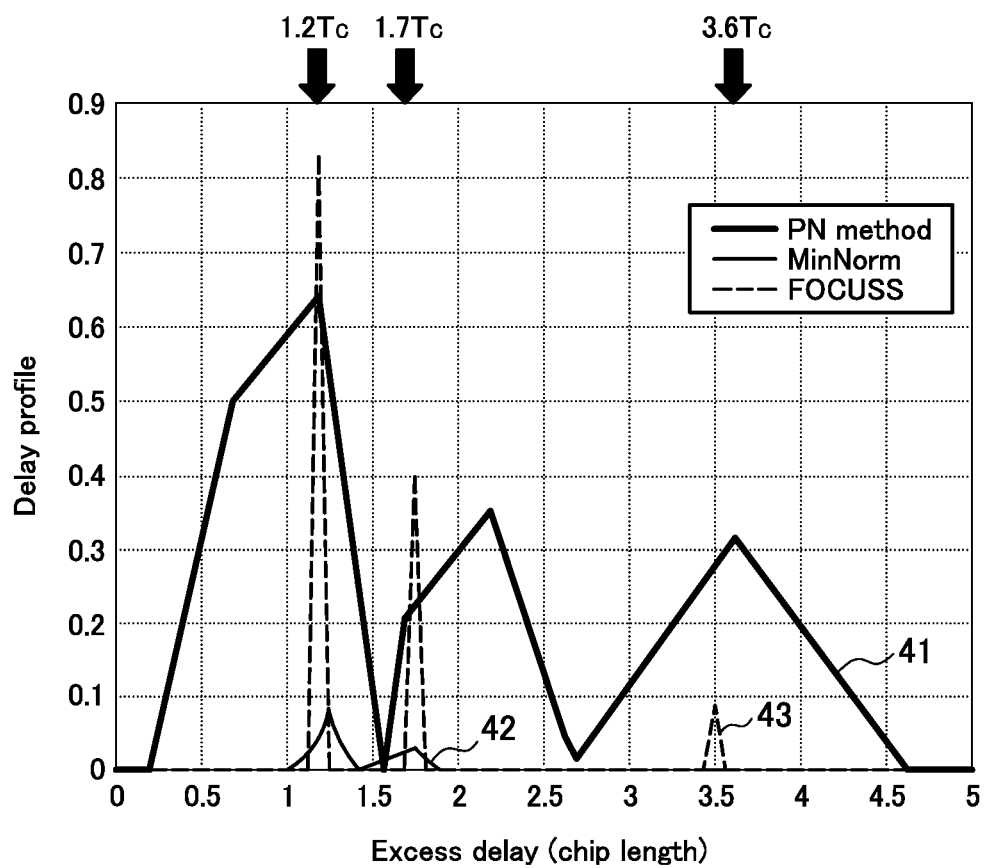
FIG. 13 is a graph for describing a simulation result according to the embodiment.

The simulation result obtained by the above-listed settings will be described with reference to FIG. 13. FIG. 13 is a graph for describing the simulation result according to the present embodiment. The graph includes a horizontal axis representing a chip length that indicates the delay time, and a vertical axis representing absolute values of CIR values (such as electric power values) or absolute values of a signal vector (such as electric power values). FIG. 13 illustrates a waveform 41, a waveform 42, and a waveform 43. The waveform 41 indicates delay profile based on the PN correlation method. The waveform 42 indicates the minimum norm solution $s_{mn}$. The waveform 43 indicates the expanded signal vector s obtained through the FOCUSS.

With reference to the waveform 43 indicating the expanded signal vector s, peaks rise near delay times $1.2T_C$, $1.7T_C$, and $3.5T_C$. The delay times at which the peaks rise are substantially the same as delay times $1.2T_C$, $1.7T_C$, and $3.6T_C$ in the simulation settings. Therefore, it is understood that it is possible to appropriately separate and detect the multipath waves through the FOCUSS.

On the other hand, with reference to the waveform 41 indicating the delay profile based on the PN correlation method, a second peak rises near delay time $2.2T_C$. This delay time $2.2T_C$ is drastically deviated from a second delay time $1.7T_C$ in the simulation settings. Therefore, it is understood that it is difficult to appropriately separate and detect the multipath waves before applying the FOCUSS. This may be because a signal coming through a fast path interferes with signals coming through paths other than the fast path.

<4.2. Estimation of Positional Parameter>

The control section 230 estimates a positional parameter on the basis of the first incoming wave detected through the above-described process.

Ranging Process

The control section 230 estimates a distance R between the portable device 100 and the communication unit 200 on the basis of reception times of the first incoming waves estimated through the above-described process. The method of estimating the distance R have been described above with reference to FIG. 7.

More specifically, the portable device 100 calculates the CIR with regard to the second ranging signal, performs the sparse reconstruction, and uses the FOCUS S. In addition, the portable device 100 measures an interval $INT_1$ and an interval $INT_2$ while treating a time corresponding to an earliest delay time bin as a reception time of the first incoming wave of the second ranging signal among the delay time bins corresponding to nonzero elements included in the elements of the expanded signal vector s. For example, in the case where $s_2$, $s_4$, and $s_6$ are the nonzero elements in $s=[s_1, s_2, \ldots, s_N]$, the interval $INT_1$ and the interval $INT_2$ is measured while treating time corresponding to the delay time $T_2$ as a reception time of the first incoming wave.

On the other hand, the communication unit 200 calculates the CIR with regard to the first ranging signal, performs the sparse reconstruction, and uses the FOCUSS. In addition, the communication unit 200 measures an interval $INT_3$ while treating the time corresponding to the earliest delay time bin as a reception time of the first incoming wave of the first ranging signal among the delay time bins corresponding to nonzero elements included in the elements of the expanded signal vector s. In a similar way, the communication unit 200 calculates the CIR with regard to the third ranging signal, performs the sparse reconstruction, and uses the FOCUSS. In addition, the communication unit 200 measures an interval $INT_4$ while treating a time corresponding to an earliest delay time bin as a reception time of the first incoming wave of the third ranging signal among the delay time bins corresponding to nonzero elements included in the elements of the expanded signal vector s.

Next, the control section 230 estimates propagation delay time on the basis of the times $INT_1$ to $INT_4$ and estimates the distance R. As described above, it is possible to search for the reception time of the first incoming wave with the resolution finer than the CIR. This makes it possible to improve the accuracy of ranging.

Angle Estimation Process

The communication unit 200 estimates angles α and β on the basis of phases obtained at the reception time of the first incoming wave estimated through the above-described process. The method of estimating the angles α and β have been described above with reference to FIG. 8.

More specifically, the control section 230 estimates the angles α and β on the basis of a phase of an element corresponding to an earliest delay time bin among one or more nonzero elements included in the expanded signal vector s. For example, in the case where $s_2$, $s_4$, and $s_6$ are the nonzero elements in $s=[s_1, s_2, \ldots, s_N]$, the control section 230 estimates the angles α and β on the basis of the phase of $s_2$.

As described above, it is possible to separate the multipath waves with resolution finer than the CIR. Therefore, it is possible to improve accuracy of estimating the angles by estimating the angles on the basis of the phase of the element corresponding to the reception time of the first incoming wave of the expanded signal vector s.

<4.3. Flow of Process>

Figure 14:
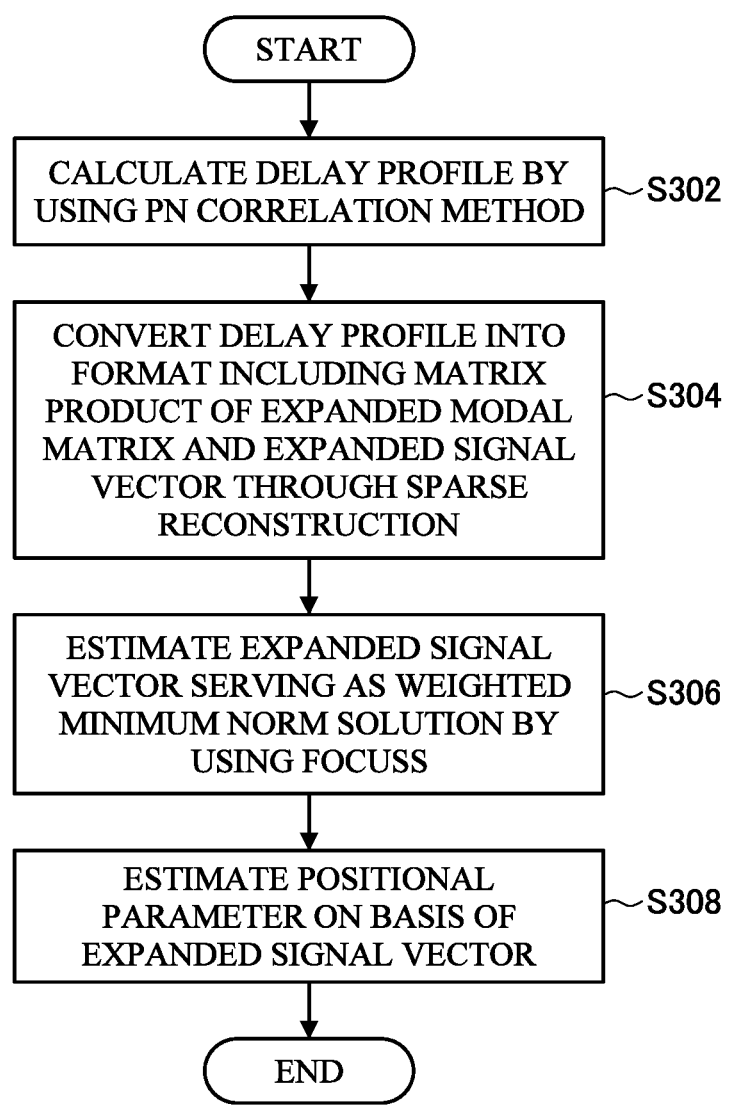
FIG. 14 is a flowchart illustrating an example of a flow of a positional parameter estimation process executed by the communication unit according to the embodiment.

FIG. 14 is a flowchart illustrating an example of a flow of a positional parameter estimation process executed by the communication unit 200 according to the present embodiment.

As illustrated in FIG. 14, the control section 230 first calculates the delay profile by using the PN correlation method (Step S302). Next, through the sparse reconstruction, the control section 230 converts the delay profile into a format including a matrix product of the expanded modal matrix and the expanded signal vector (Step S304). Next, the control section 230 estimates an expanded signal vector serving as the weighted minimum norm solution by using the FOCUSS (Step S306). Next, the control section 230 estimates the positional parameter on the basis of the expanded signal vector that has been estimated (Step S308).

<4.4. FOCUSS Application Target>

As described above, the transmitter may transmit a signal including a preamble which includes a plurality of preamble symbols as the transmission signal. In this case, the receiver may calculate CIRs for respective preamble symbols by correlating the preamble symbols with respective portions of the reception signal corresponding to the plurality of preamble symbols at the designated interval.

The FOCUSS may be applied to integrated CIRs obtained by integrating CIRs of the respective preamble symbols. In other words, when converting the CIR into a format including the matrix product of the expanded modal matrix and the expanded signal vector, the control section 230 may convert the integrated CIRs obtained by integrating the CIRs of the respective preamble symbols, into the format including the matrix product of the expanded modal matrix and the expanded signal vector. Next, the sparse solution of the expanded signal vector s is estimated through the FOCUSS, and the reception time of the first incoming wave is estimated.

On the other hand, the FOCUSS may be applied to the CIRs of the respective preamble symbols. In this case, the expanded signal vector s may eventually be estimated by integrating the expanded signal vectors s estimated with regard to the respective preamble symbols. In this case, when estimating the reception time of the first incoming wave on the basis of the expanded signal vector s, the control section 230 may estimate the reception time of the first incoming wave on the basis of the integrated expanded signal vectors s that are a result of integrating the expanded signal vectors s with regard to the respective CIRs of the plurality of preambles.

Note that, the CIR may be calculated for each pulse. In this case, the FOCUSS may be applied to integrated CIRs obtained by integrating CIRs of respective pulses, or may be applied to a CIR of each pulse.

Alternatively, the CIR may be calculated with regard to the entire preamble. In this case, the FOCUSS may be applied to the CIR calculated with regard to the entire preamble.

It is possible to obtain similar results by using any of the methods.

<4.5. FOCUSS Application Range>

The FOCUSS may be applied to the entire CIR. For example, the FOCUSS may be applied while setting the delay time bins as from 0 to $5T_C$ on the basis of the simulation settings shown in Table 1.

On the other hand, the FOCUSS may be applied to a portion of the CIR. Specifically, the FOCUSS may be applied to a vector (hereinafter, referred to as a partial vector) including elements corresponding to a portion of set times among elements corresponding to the plurality of set times in the expanded signal vector s. In this case, the control section 230 estimates sparse solution of the partial vector as estimation of the sparse solution of the expanded signal vector s. In other words, the control section 230 estimates a weighted minimum norm solution serving as a vector that minimizes a norm of a vector obtained by weighting the partial vector. This makes it possible to reduce calculation load in comparison with the case where the FOCUSS is applied to the entire CIR.

In particular, to detect the first incoming wave, it is desirable to apply the FOCUSS to a limited portion of CIR near the reception time of the first incoming wave. In this case, the FOCUSS may be applied to a partial vector including elements corresponding to set time in the vicinity of the reception time of the first incoming wave among elements corresponding to the plurality of set times in the expanded signal vector s. In the case of calculating the CIR on the basis of the preamble symbol, strong correlation is obtained at a delay time at which a pulse sequence of the transmission signal is completely identical to a pulse sequence of the reception signal, and weak correlation is obtained at the other delay times. Therefore, it is possible to maintain the accuracy of detecting the first incoming wave even if the FOCUSS is applied to limited portion of CIR near the reception time of the first incoming wave among the entire CIR.

Figure 15:
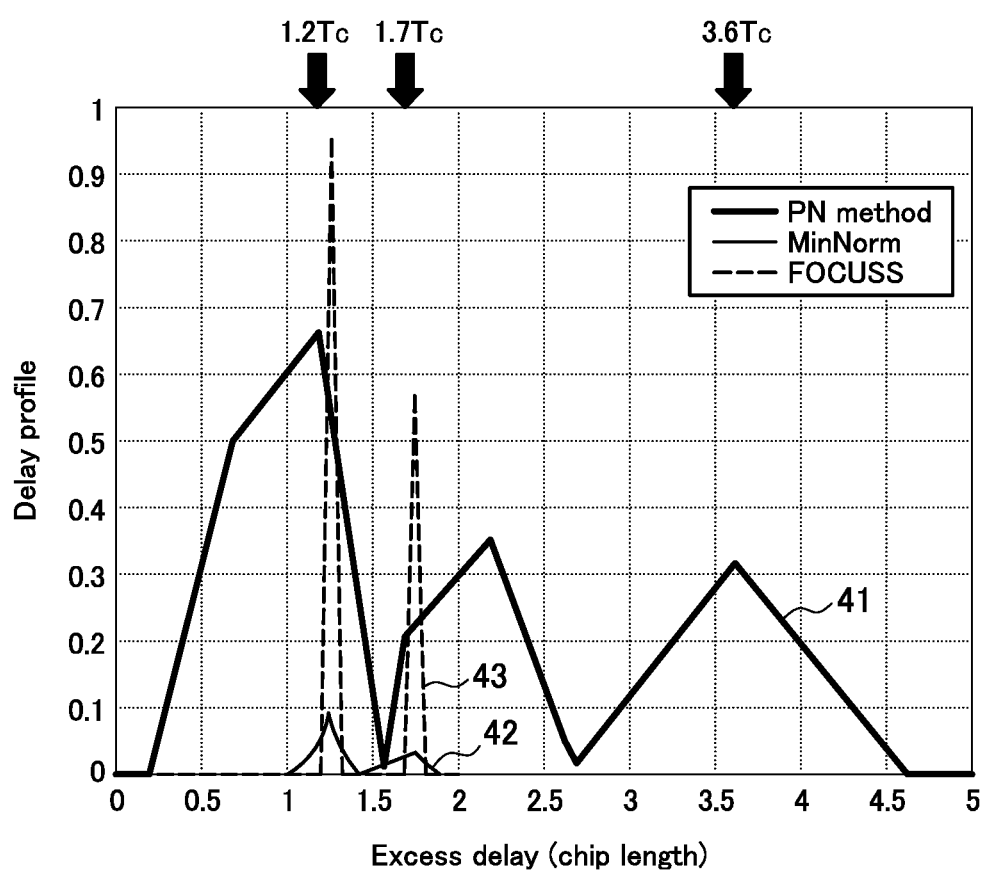
FIG. 15 is a graph for describing a simulation result according to the embodiment.

For example, the FOCUSS may be applied while setting the delay time bins as from 0 to $2T_C$ on the basis of the simulation settings shown in Table 1. FIG. 15 illustrates a simulation result obtained in such a case.

FIG. 15 is a graph for describing the simulation result according to the present embodiment. FIG. 15 illustrates a waveform 41, a waveform 42, and a waveform 43. The waveform 41 indicates delay profile based on the PN correlation method. The waveform 42 indicates the minimum norm solution $s_{mn}$. The waveform 43 indicates the expanded signal vector s obtained through the FOCUSS. The waveform 42 indicating the minimum norm solution $s_{mn}$ and the waveform 43 indicating the expanded signal vector s are plotted from 0 to $2T_C$, but they are not plotted after $2T_C$. In other words, calculation is omitted after $2T_C$, and it is understood that calculation load is reduced.

With reference to the waveform 43 indicating the expanded signal vector s, peaks rise near delay times $1.2T_C$ and $1.7T_C$. The delay times at which the peaks rise are substantially the same as delay times $1.2T_C$ and $1.7T_C$ in the simulation settings. Therefore, it is understood that it is possible to appropriately separate and detect the multipath waves in the application range even if the FOCUSS application range is limited.

As described above, when the FOCUSS is applied to limited portion of CIR near the reception time of the first incoming wave among the entire CIR, it is possible to maintain the accuracy of detection and reduce the calculation load in comparison with the case where the FOCUSS is applied to the entire CIR.

<4.6. Modification>

According to the above-described embodiment, the case where the norm is a so-called l0 norm has been described. The l0 norm is obtained in the case where a multiplier p is zero with regard to an lp norm. The lp norm is defined by an equation listed below.

$$\|x\|_p = |x_1|^p + |x_2|^p + \ldots + |x_n|^p \qquad (49)$$

On the other hand, the l0 norm is defined by an equation listed below. The equation is obtained by substituting 0 for p in the equation (49) listed above.

$$\|x\|_0 = |x_1|^0 + |x_2|^0 + \ldots + |x_n|^0 \qquad (50)$$

However, it is assumed that $0^0=0$ in the equation (50).

In other words, the l0 norm is the number of nonzero components in a vector.

The method of iteratively calculating the equation (36) to the equation (38) described according to the above-described embodiment is a method of minimizing the l0 norm as the weighted minimum norm solution of the expanded vector s. Alternatively, the control section 230 may minimize the lp norm as a weighted minimum norm solution of the expanded vector s. Specifically, the control section 230 may use an equation listed below instead of the above-described equations in STEP 1.

STEP 1:

$$W_k = \operatorname{diag}\left(|s_{k-1}|^{1-\frac{p}{2}}\right) \qquad (51)$$

Here, p is a constant that is 0 or more and 1 or less. In the case where p is 0, the above-described equation (51) becomes identical to the equation (36). In other words, the control section 230 may estimate the weighted minimum norm solution by substituting 0 for p in the equation (51).

In the case where p is a value other than 0, it is possible to accurately estimate reception time of the first incoming wave in a way similar to the above-described embodiment.

5. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the above-described embodiment, the control section 230 calculates the CIR, detects the first incoming wave, and estimates the positional parameter. However, the present invention is not limited thereto. Any of the above-described processes may be performed by the wireless communication section 210. For example, each of the plurality of wireless communication sections 210 may calculate the CIR and detect the first incoming wave on the basis of the reception signal received by each of the plurality of wireless communication sections 210. In addition, the positional parameter may be estimated by the wireless communication section 210 that functions as the master.

For example, according to the above-described embodiment, the description has been given with reference to the example in which the angles α and β are calculated on the basis of antenna array phase differences between antennas in a pair. However, the present invention is not limited thereto. For example, the communication unit 200 may calculate the angles α and β through beamforming using the plurality of antennas 211. In this case, the communication unit 200 scans main lobes of the plurality of antennas 211 in all the directions, determines that the portable device 100 exists in a direction with largest reception electric power, and calculates the angles α and β on the basis of this direction.

For example, according to the above-described embodiment, as described with reference to FIG. 3, the local coordinate system has been treated as a coordinate system including coordinate axes parallel to axes connecting the antennas in the pairs. However, the present invention is not limited thereto. For example, the local coordinate system may be a coordinate system including coordinate axes that are not parallel to the axes connecting the antennas in the pairs. In addition, the origin is not limited to the center of the plurality antennas 211. The local coordinate system according to the present embodiment may be arbitrarily set on the basis of arrangement of the plurality of antennas 211 of the communication unit 200.

For example, although the example in which the portable device 100 serves as the authenticatee and the communication unit 200 serves as the authenticator has been described in the above embodiment, the present invention is not limited thereto. The roles of the portable device 100 and the communication unit 200 may be reversed. For example, the positional parameter may be determined by the portable device 100. In addition, the roles of the portable device 100 and the communication unit 200 may be switched dynamically. In addition, a plurality of the communication units 200 may determine the positional parameters, and perform authentication.

For example, although the example in which the present invention is applied to the smart entry system has been described in the above embodiment, the present invention is not limited thereto. The present invention is applicable to any system that estimates the positional parameter and performs the authentication by transmitting/receiving signals. For example, the present invention is applicable to a pair of any two devices selected from a group including portable devices, vehicles, smartphones, drones, houses, home appliances, and the like. In this case, one in the pair operates as the authenticator, and the other in the pair operates as the authenticatee. Note that, the pair may include two device of a same type, or may include two different types of devices. In addition, the present invention is applicable to a case where a wireless local area network (LAN) router determines a position of a smartphone.

For example, in the above embodiment, the standard using UWB has been exemplified as the wireless communication standard. However, the present invention is not limited thereto. For example, it is also possible to use a standard using infrared as the wireless communication standard.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using flowcharts are not necessarily executed in the order illustrated in the drawings. Some processing steps may be executed in parallel. In addition, additional processing steps may be employed and some processing steps may be omitted.

REFERENCE SIGNS LIST 1 system
100 portable device
110 wireless communication section
111 antenna
120 storage section
130 control section
200 communication unit
202 vehicle
210 wireless communication section
211 antenna
220 storage section
230 control section

What is claimed is:

1. A communication device, comprising:
a wireless communicator configured to wirelessly receive a signal from another communication device; and
a controller configured to
correlate a first signal with a second signal at a designated interval, the second signal corresponding to the first signal and being received by the wireless communicator in a case where the other communication device transmits a signal including a pulse as the first signal,
convert a correlation computation result that is a result of correlating the first signal with the second signal at the designated interval into a format including a matrix product of an expanded modal matrix and an expanded signal vector, the expanded modal matrix being a matrix including a plurality of elements indicating the correlation computation result obtained when assuming that the second signal is received at respective set times, the expanded signal vector being a vector including a plurality of elements, each of which indicates whether or not there is the second signal received at each of the set times and amplitude and a phase of the second signal, and
estimate reception time of the second signal on a basis of the set times corresponding to the plurality of elements of the expanded signal vector,
wherein an interval between the set times is shorter than the designated interval.

2. The communication device according to claim 1, wherein the controller estimates a set time corresponding to a nonzero element as reception time of the second signal, among the set times corresponding to the plurality of elements of the expanded signal vector.

3. The communication device according to claim 2, wherein the controller estimates a sparse solution of the expanded signal vector and estimates a set time corresponding to the nonzero element as the reception time of the second signal among the sparse solution of the expanded signal vector,
the sparse solution is a vector including a predetermined number of the nonzero elements, and the predetermined number is a number of pulses included in the second signal as pulses corresponding to the single pulse included in the first signal.

4. The communication device according to claim 3, wherein the controller estimates an earliest set time as the reception time of the second signal among the set times corresponding to the nonzero elements included in the sparse solution of the expanded signal vector that has been estimated.

5. The communication device according to claim 3, wherein the controller estimates a weighted minimum norm solution as estimation of the sparse solution of the expanded signal vector, the weighted minimum norm solution being a vector that minimizes a norm of a vector obtained by weighting the expanded signal vector.

6. The communication device according to claim 5, wherein the controller estimates the weighted minimum norm solution by iteratively calculating an equation (1), an equation (2), and an equation (3):

$$W_k = \text{diag}\left(|s_{k-1}|^{1-\frac{p}{2}}\right) \quad (1)$$

$$q_k = (AW_k)^- z \quad (2)$$

$$s_k = W_k q_k \quad (3)$$

where k is the number of iterations, $s_k$ is a candidate for the weighted minimum norm solution, p is a constant that is 0 or more and 1 or less, A is the expanded modal matrix, $(AW_k)^-$ is a generalized inverse matrix of $AW_k$, $W_k$ is a weighting matrix at the number of iterations k, z is the correlation computation result, $q_k$ is a vector given by the equation (2), and an initial value of $s_k$ is given by an equation (4)

$$S|_{k=0} = S_{mn} \quad (4)$$

where $s_{mn}$ is the expanded signal vector that minimizes the norm of the expanded signal vector.

7. The communication device according to claim 6, wherein the controller estimates the weighted minimum norm solution by substituting 0 for p in the equation (1).

8. The communication device according to claim 6, wherein the controller decomposes $AW_k$ in the equation (2) into a format including a diagonal matrix through singular value decomposition, and calculates $(AW_k)^-$, the diagonal matrix including singular values that are larger than a predetermined threshold.

9. The communication device according to claim 6, wherein the controller uses an equation (5) instead of the equation (2), $$q_k = A_k^H (A_k A_k^H)^{-1} Z$$

$$\text{with } A_k = AW_k \quad (5)$$

where $A_k^H$ is an adjoint matrix of $A_k$.

10. The communication device according to claim 9, wherein the controller uses an equation (6) instead of the equation (5), $$q_k = A_k^H (A_k A_k^H + \alpha I)^{-1} Z$$

$$\text{with } A_k = AW_k \quad (6)$$

where $\alpha$ is a positive infinitesimal, and I is an identity matrix.

11. The communication device according to claim 6, wherein the controller substitutes 0 for an element that is a predetermined threshold or less among elements included in $W_k$ in the equation (1).

12. The communication device according to claim 3, wherein the controller estimates a weighted minimum norm solution as estimation of the sparse solution of the expanded signal vector, the weighted minimum norm solution being a vector that minimizes a norm of a vector obtained by weighting a vector including elements corresponding to a portion of the set times among the elements corresponding to the plurality of set times in the expanded signal vector.

13. The communication device according to claim 1, wherein the controller calculates a distance between the communication device and the other communication device on a basis of the estimated reception time of the second signal.

14. The communication device according to claim 1, wherein the controller estimates an angle between a coordinate axis and a straight line connecting the other communication device to an origin of a coordinate system based on the communication device, on a basis of a phase of an element corresponding to an earliest set time among one or more nonzero elements included in the expanded signal vector.

15. The communication device according to claim 1, wherein the other communication device transmits a signal including a plurality of preamble symbols that are a pulse sequence including one or more pulses, as the first signal, and the controller converts a result into the format including the matrix product of the expanded modal matrix and the expanded signal vector as conversion of the correlation computation results into the format including the matrix product of the expanded modal matrix and the expanded signal vector, the result being obtained by integrating a plurality of the correlation computation results that are results of correlating the plurality of preamble symbols with respective portions of the second signal corresponding to the preamble symbols at the designated interval.

16. The communication device according to claim 1, wherein the other communication device transmits a signal including a plurality of preamble symbols that are a pulse sequence including one or more pulses, as the first signal, and the controller estimates the reception time of the second signal on a basis of a result obtained by integrating the respective expanded signal vectors with regard to a plurality of the correlation computation results that are results of correlating the plurality of preamble symbols with respective portions of the second signal corresponding to the preamble symbols at the designated interval, as estimation of the reception time of the second signal.

17. An information processing method, comprising:

wirelessly receiving a signal from another communication device;

correlating a first signal with a second signal at a designated interval, the second signal corresponding to the first signal and being received in a case where the other communication device transmits a signal including a pulse as the first signal;

converting a correlation computation result that is a result of correlating the first signal with the second signal at the designated interval into a format including a matrix product of an expanded modal matrix and an expanded signal vector, the expanded modal matrix being a matrix including a plurality of elements indicating the correlation computation result obtained when assuming that the second signal is received at respective set times, the expanded signal vector being a vector including a plurality of elements, each of which indicates whether or not there is the second signal received at each of the set times and amplitude and a phase of the second signal; and estimating reception time of the second signal on a basis of the set times corresponding to the plurality of elements of the expanded signal vector, wherein an interval between the set times is shorter than the designated interval.

18. A non-transitory storage medium having a program stored therein, the program causing a computer to function as a controller configured to correlate a first signal with a second signal at a designated interval, the second signal corresponding to the first signal and being received by a wireless communicator that wirelessly receives a signal from another communication device in a case where the other communication device transmits a signal including a pulse as the first signal, convert a correlation computation result that is a result of correlating the first signal with the second signal at the designated interval into a format including a matrix product of an expanded modal matrix and an expanded signal vector, the expanded modal matrix being a matrix including a plurality of elements indicating the correlation computation result obtained when assuming that the second signal is received at respective set times, the expanded signal vector is a vector including a plurality of elements, each of which indicates whether or not there is the second signal received at each of the set times and amplitude and a phase of the second signal, and estimate reception time of the second signal on a basis of the set times corresponding to the plurality of elements of the expanded signal vector, wherein an interval between the set times is shorter than the designated interval.

* * * * *